United States Patent
Okuyama

(10) Patent No.: US 11,194,198 B2
(45) Date of Patent: Dec. 7, 2021

(54) DISPLAY DEVICE INCLUDING A FIRST DISPLAY PANEL AND A SECOND DISPLAY PANEL

(71) Applicant: Japan Display Inc., Minato-ku (JP)

(72) Inventor: Kentaro Okuyama, Tokyo (JP)

(73) Assignee: Japan Display Inc., Minato-ku (JP)

( * ) Notice: Subject to any disclaimer, the term of this patent is extended or adjusted under 35 U.S.C. 154(b) by 35 days.

(21) Appl. No.: 16/360,670

(22) Filed: Mar. 21, 2019

(65) Prior Publication Data
US 2019/0302523 A1 Oct. 3, 2019

(30) Foreign Application Priority Data
Mar. 27, 2018 (JP) .............................. JP2018-059853

(51) Int. Cl.
| | | |
|---|---|---|
| *G02F 1/1347* | (2006.01) | |
| *G02F 1/1334* | (2006.01) | |
| *G02F 1/1335* | (2006.01) | |
| *G02F 1/13357* | (2006.01) | |
| *G02F 1/13363* | (2006.01) | |

(52) U.S. Cl.
CPC .......... *G02F 1/1347* (2013.01); *G02F 1/1334* (2013.01); *G02F 1/13363* (2013.01); *G02F 1/133528* (2013.01); *G02F 1/133615* (2013.01)

(58) Field of Classification Search
None
See application file for complete search history.

(56) References Cited

U.S. PATENT DOCUMENTS

| | | | |
|---|---|---|---|
| 9,983,437 B2 | 5/2018 | Okuyama | |
| 2006/0285040 A1* | 12/2006 | Kobayashi | G02F 1/1323 349/117 |
| 2012/0268689 A1* | 10/2012 | Nakajima | G02F 1/133615 349/64 |
| 2013/0271674 A1* | 10/2013 | Liu | G02F 1/133621 349/12 |
| 2016/0070047 A1 | 3/2016 | Okuyama et al. | |
| 2017/0219840 A1* | 8/2017 | Okuyama | G02F 1/13363 |
| 2017/0269433 A1* | 9/2017 | Sugiyama | G02B 6/00 |
| 2017/0285420 A1 | 10/2017 | Okuyama et al. | |
| 2017/0322359 A1* | 11/2017 | Park | G02B 6/005 |
| 2018/0074356 A1 | 3/2018 | Okuyama | |
| 2019/0107752 A1* | 4/2019 | Yoon | G02F 1/13471 |

FOREIGN PATENT DOCUMENTS

| | | |
|---|---|---|
| JP | 2003-149686 | 5/2003 |
| JP | 2013-041098 | 2/2013 |

* cited by examiner

*Primary Examiner* — Thanh Nhan P Nguyen
(74) *Attorney, Agent, or Firm* — Oblon, McClelland, Maier & Neustadt, L.L.P.

(57) ABSTRACT

According to one embodiment, there is provided a display device including a first display panel, a second display panel, a polarizer, and a light source unit. The first display panel includes a first liquid crystal layer. The second display panel includes a second liquid crystal layer. The polarizer has an absorption axis which allows absorption of linearly polarized light. The light source unit is opposed to a first end portion of the first display panel and a second end portion of the second display panel. Each of the first liquid crystal layer and the second liquid crystal layer includes streak-like polymers and liquid crystal molecules.

8 Claims, 18 Drawing Sheets

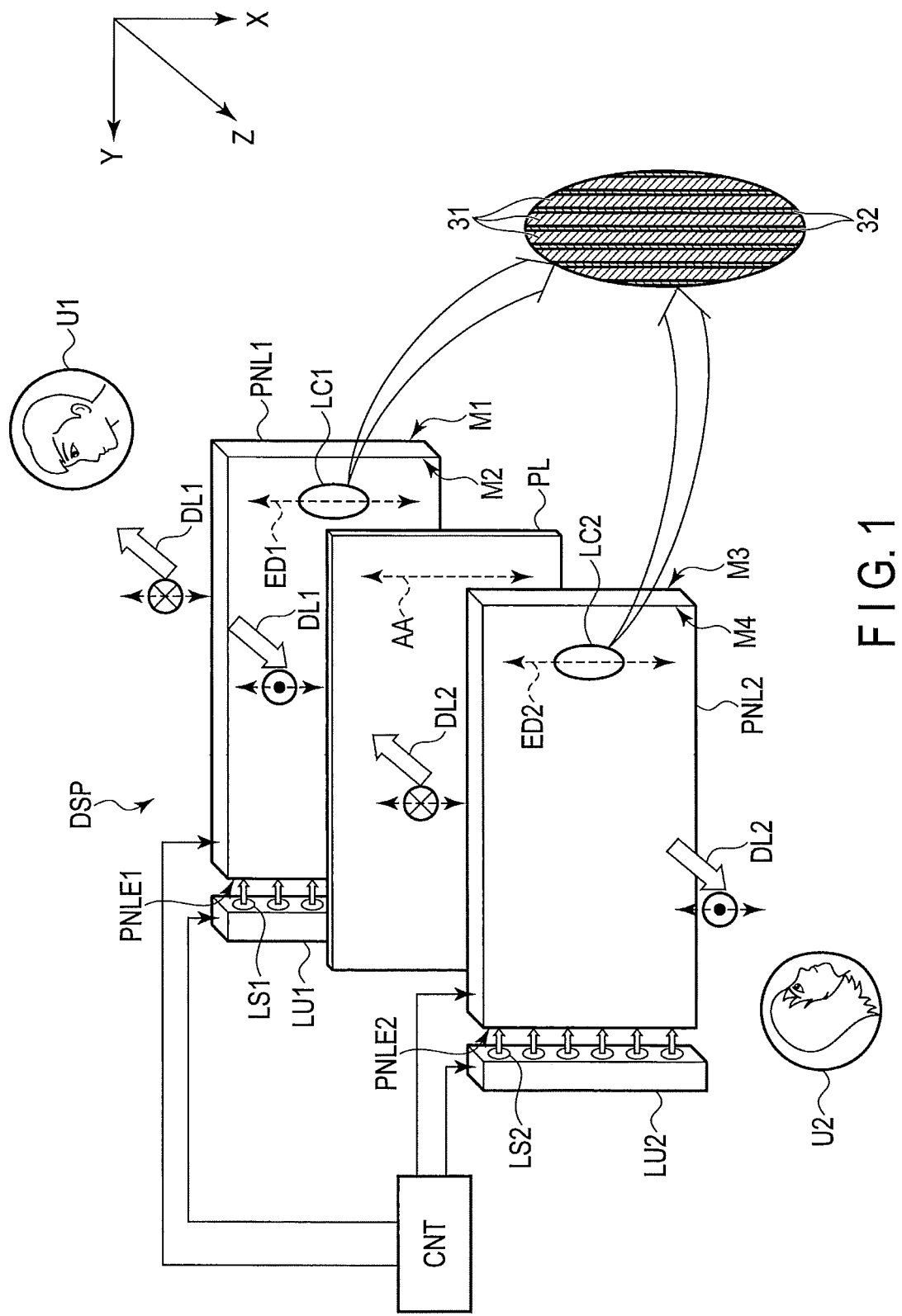
F I G. 1

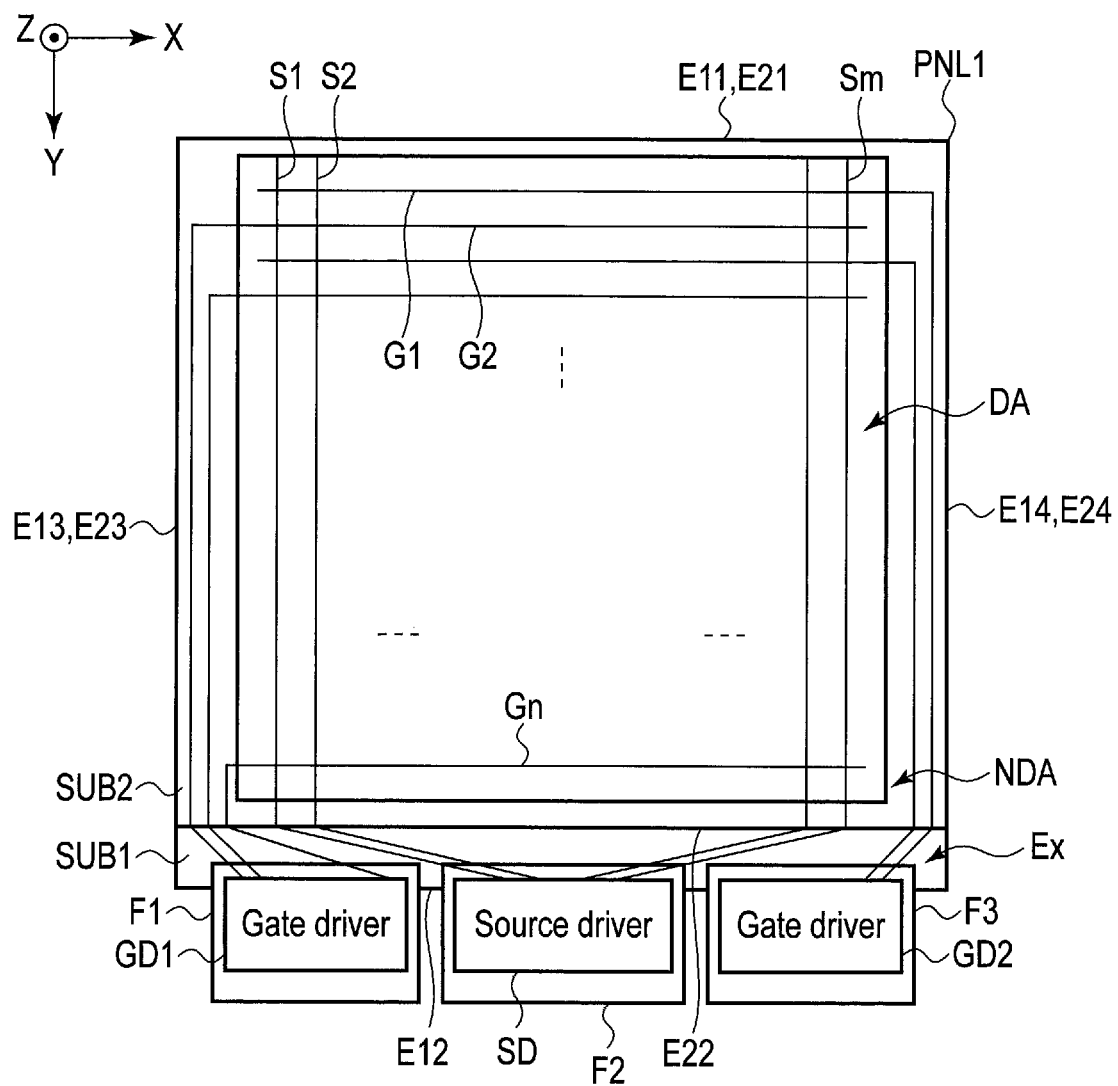
F I G. 2

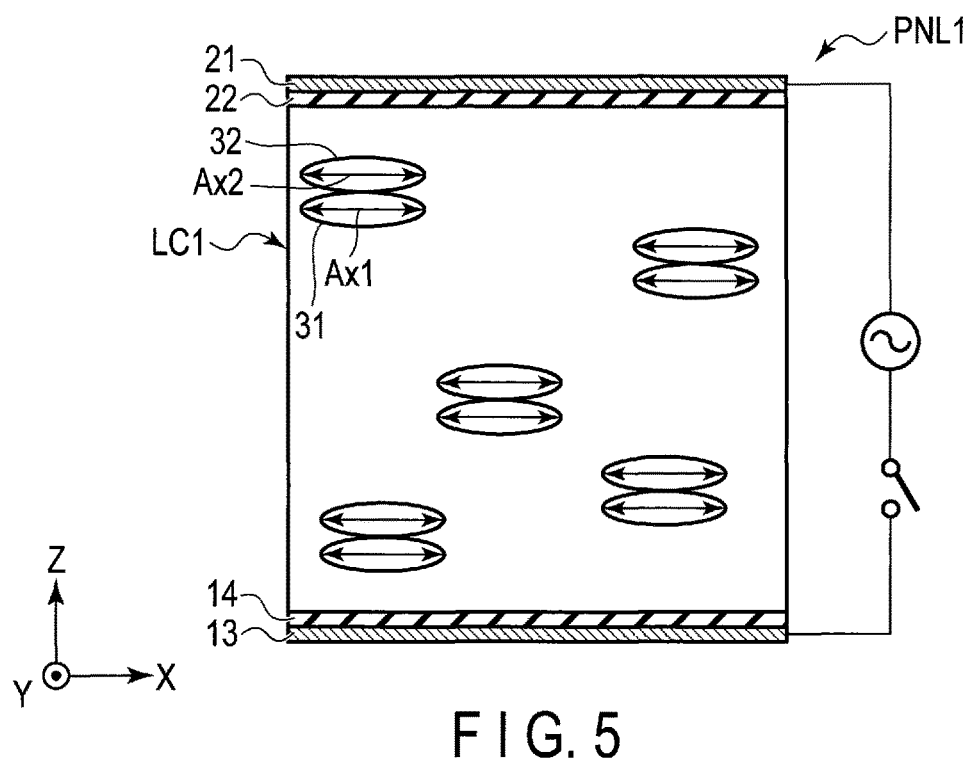
F I G. 5
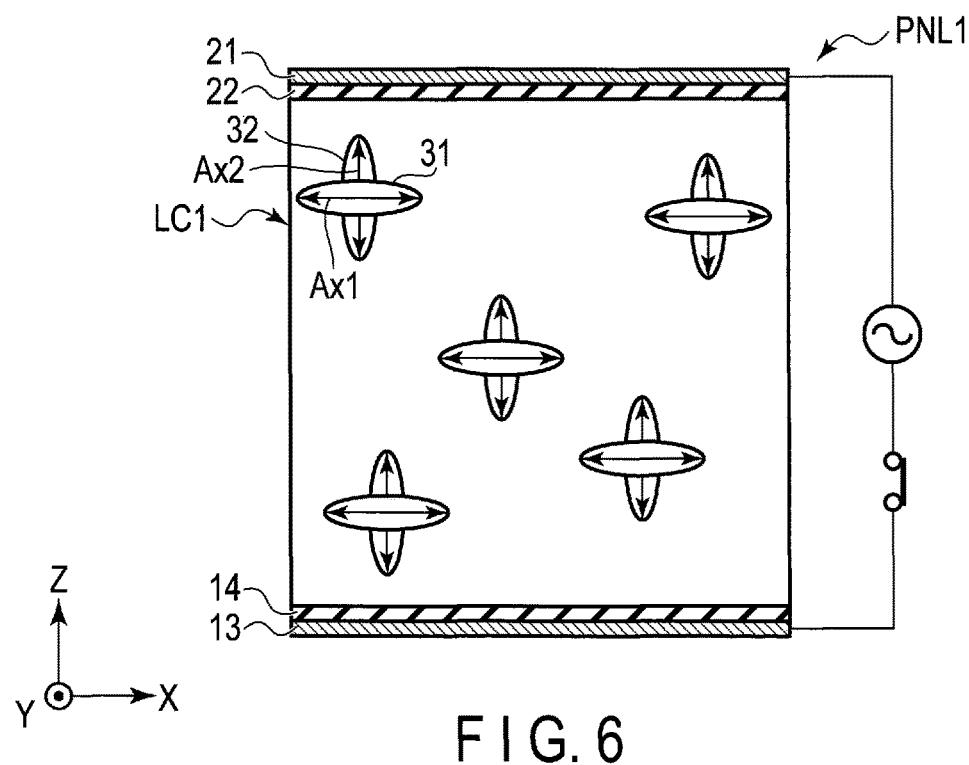
F I G. 6

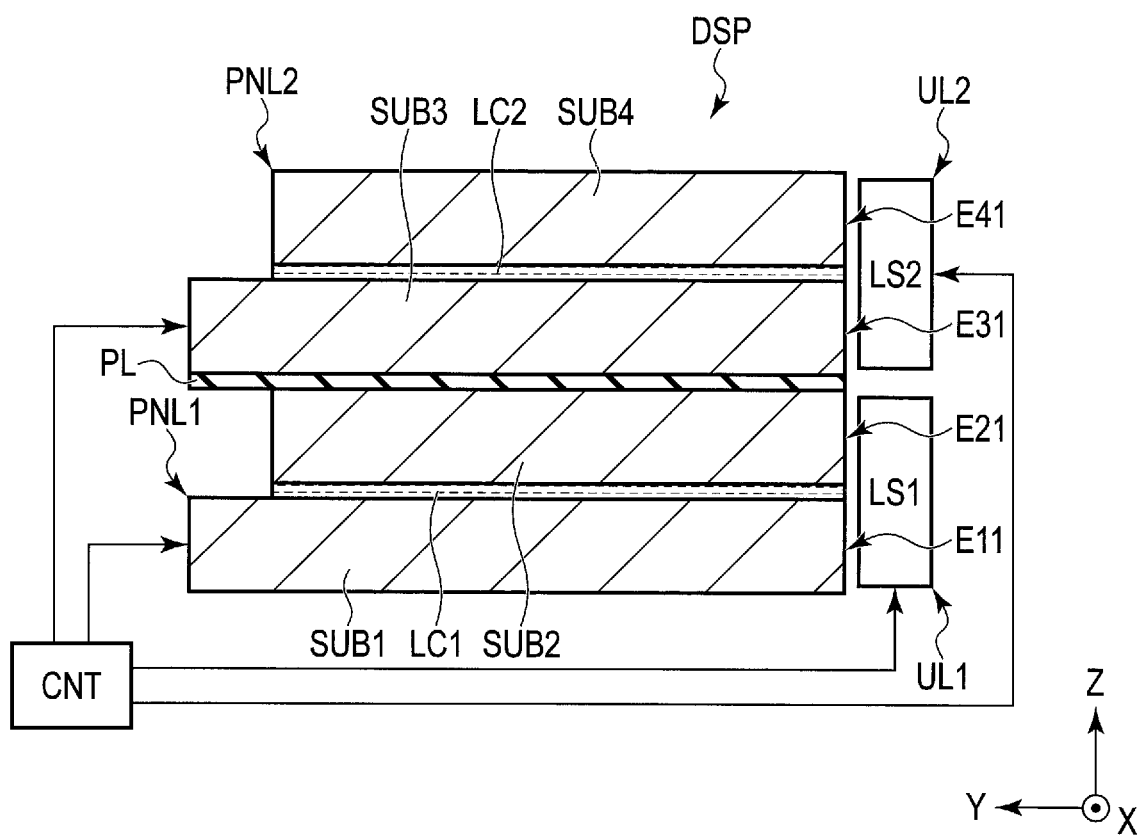
F I G. 9C

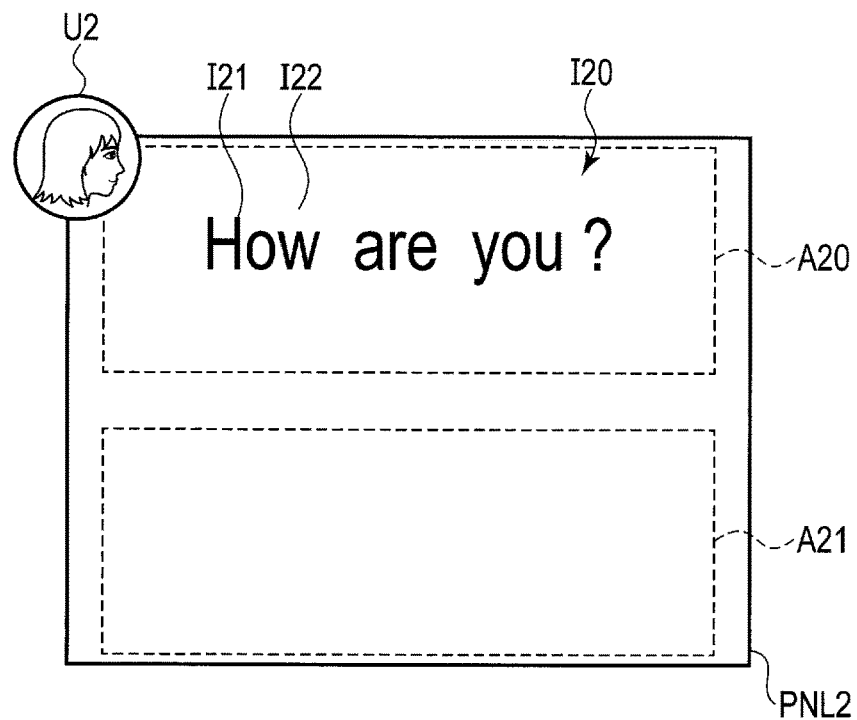
F I G. 11
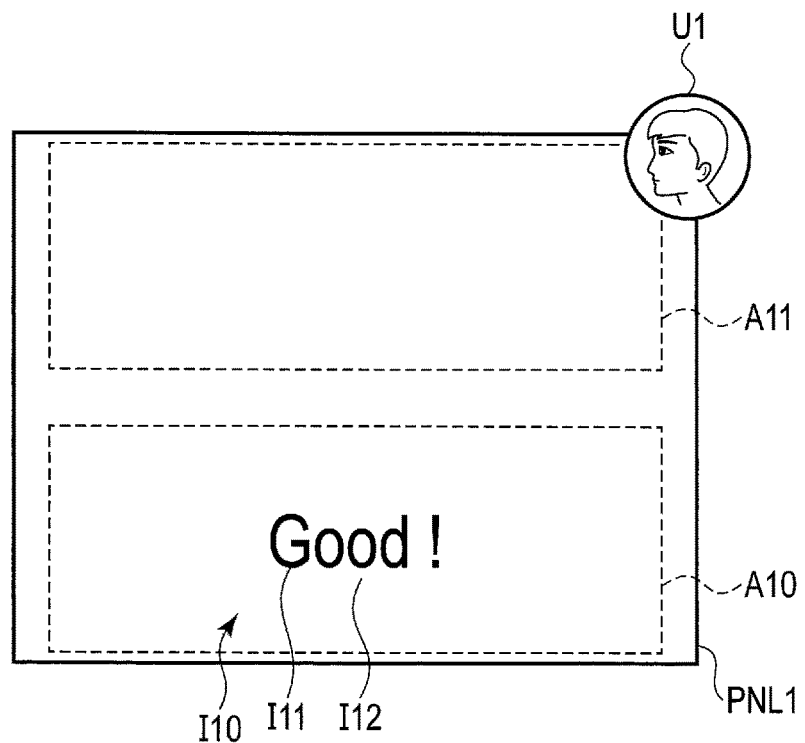
F I G. 12

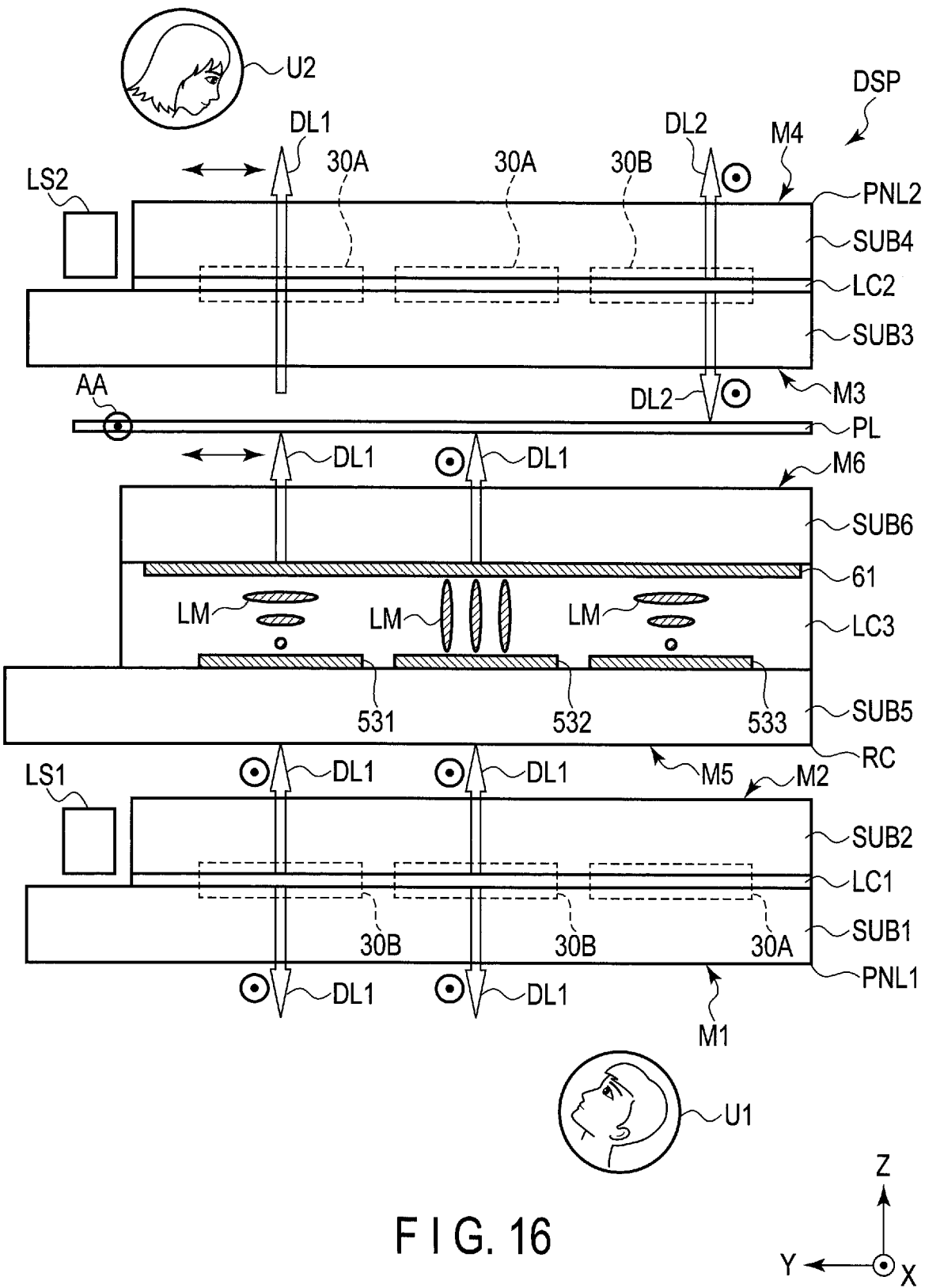
F I G. 16

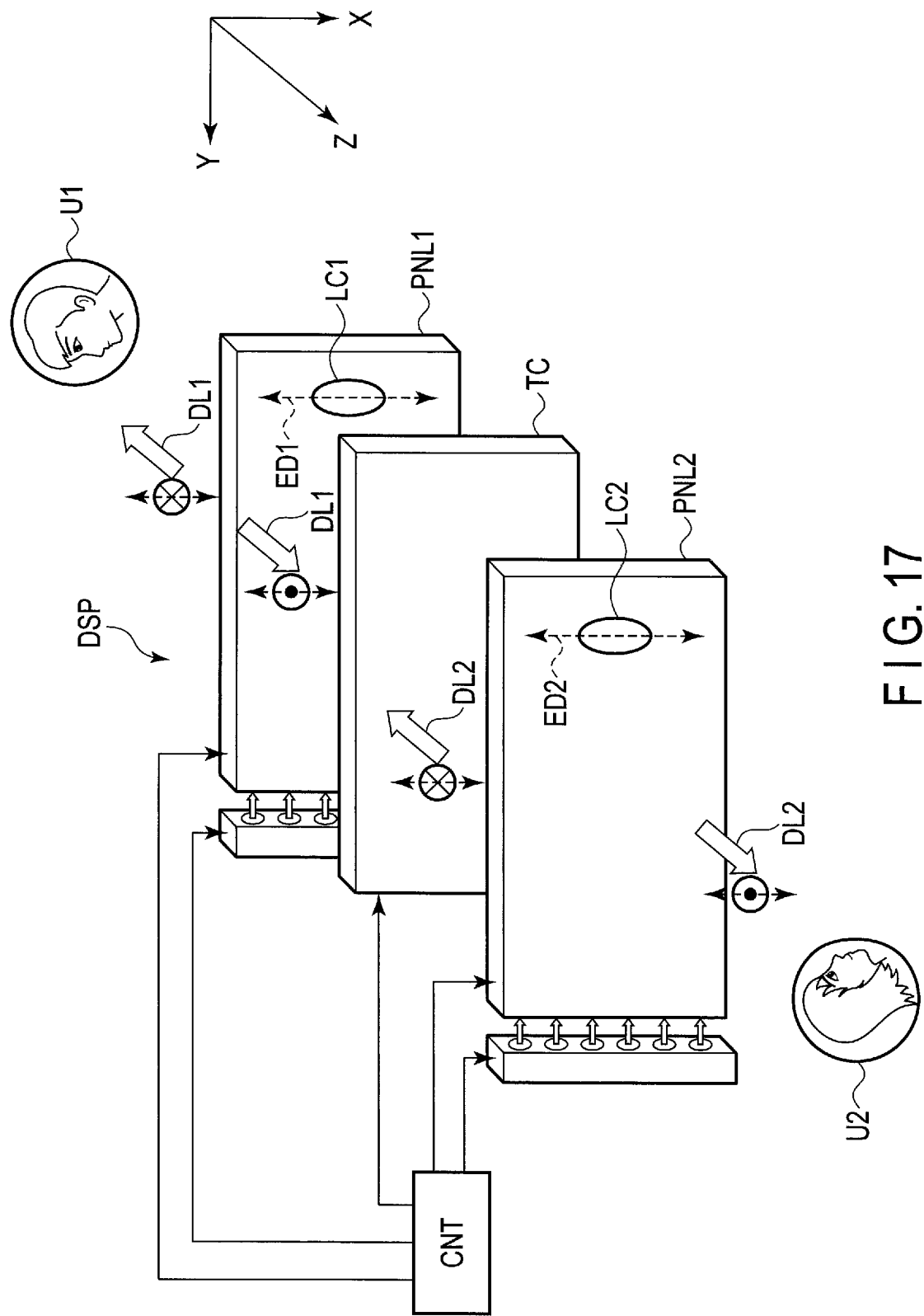
F I G. 17

DISPLAY DEVICE INCLUDING A FIRST DISPLAY PANEL AND A SECOND DISPLAY PANEL

CROSS-REFERENCE TO RELATED APPLICATIONS

This application is based upon and claims the benefit of priority from Japanese Patent Application No. 2018-059853, filed Mar. 27, 2018, the entire contents of which are incorporated herein by reference.

FIELD

Embodiments described herein relate generally to a display device.

BACKGROUND

Recently, various display devices have been proposed. In one example, a transmittance-variable element comprising a transmissive element having a light control layer and a half mirror layer disposed on the transmissive element, and having a see-through function and a mirror function has been disclosed.

In another example, the so-called transparent display device has been disclosed. In the transparent display device, when an image of letters, etc., is displayed on one display surface, the image will be seen as a mirror image on the opposite display surface. Therefore, a transparent display device comprising a transmittance changing portion, which is a twisted nematic (TN) liquid crystal device, between two transmissive double-side light-emitting panels has been proposed.

BRIEF DESCRIPTION OF THE DRAWINGS

FIG. 1 is a perspective view showing a configuration example of a display device DSP of the present embodiment.

FIG. 2 is a plan view showing a configuration example of the first display panel PNL1 shown in FIG. 1.

FIG. 5 is a diagram schematically showing a first liquid crystal layer LC1 in an off state.

FIG. 6 is a diagram schematically showing the first liquid crystal layer LC1 in an on state.

FIG. 9C is a cross-sectional view showing another configuration example of the display device DSP of the present embodiment.

FIG. 11 is a diagram showing an example of a display image I20 of a second display panel PNL2 seen by a user U2.

FIG. 12 is a diagram showing an example of a display image I10 of the first display panel PNL1 seen by a user U1.

FIG. 16 is an explanatory diagram showing the display mode of the display device DSP shown in FIG. 15.

FIG. 17 is a perspective view showing another configuration example of the display device DSP of the present embodiment.

DETAILED DESCRIPTION

Figure 3:
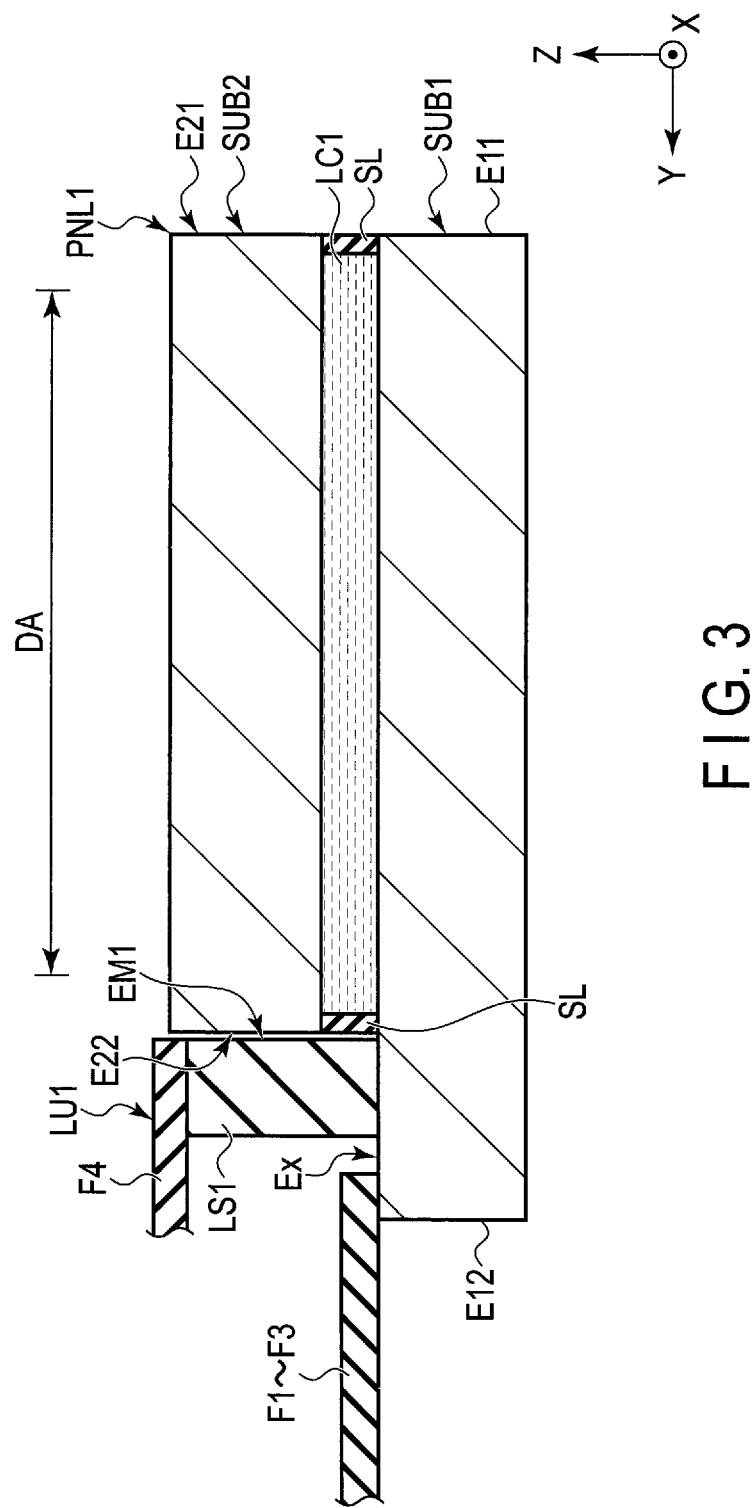
FIG. 3 is a cross-sectional view showing the first display panel PNL1 shown in FIG. 2.

In general, according to one embodiment, there is provided a display device comprising a first display panel including a first substrate, a second substrate opposed to the first substrate and a first liquid crystal layer held between the first substrate and the second substrate, a second display panel including a third substrate, a fourth substrate opposed to the third substrate and a second liquid crystal layer held between the third substrate and the fourth substrate, a polarizer located between the second substrate and the third substrate and having an absorption axis which allows absorption of linearly polarized light, and a light source unit opposed to a first end portion of the first display panel and a second end portion of the second display panel. Each of the first liquid crystal layer and the second liquid crystal layer includes streak-like polymers and liquid crystal molecules.

According to another embodiment, there is provided a display device comprising a first display panel including a first substrate, a second substrate opposed to the first substrate and a first liquid crystal layer held between the first substrate and the second substrate, a second display panel including a third substrate, a fourth substrate opposed to the third substrate and a second liquid crystal layer held between the third substrate and the fourth substrate, a polarizer located between the second substrate and the third substrate and having an absorption axis which allows absorption of linearly polarized light, and a light source unit opposed to a first end portion of the first display panel and a second end portion of the second display panel. The first display panel emits illumination light from the light source unit as first display light from the first substrate and the second substrate. The second display panel emits illumination light from the light source unit as second display light from the third substrate and the fourth substrate. The first display light and the second display light are linearly polarized light. At least one of the first display light and the second display light has a vibration plane parallel to the absorption axis.

According to yet another embodiment, there is provided a display device comprising a first display panel including a first substrate, a second substrate opposed to the first substrate and a first liquid crystal layer held between the first substrate and the second substrate, a second display panel including a third substrate, a fourth substrate opposed to the third substrate and a second liquid crystal layer held between the third substrate and the fourth substrate, a transmittance control element located between the first display panel and the second display panel, and a light source unit opposed to a first end portion of the first display panel and a second end portion of the second display panel. The transmittance control element has an absorbing mode in which the transmittance control element absorbs linearly polarized light and a transmitting mode in which the transmittance control element transmits the linearly polarized light.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like of the respective parts are illustrated schematically in the drawings, rather than as an accurate representation of what is implemented, but such schematic illustration is merely exemplary, and in no way restricts the interpretation of the invention. In addition, in the specification and drawings, structural elements which function in the same or a similar manner to those described in connection with preceding drawings are denoted by like reference numbers, detailed description thereof being omitted unless necessary.

FIG. 1 is a perspective view showing a configuration example of a display device DSP of the present embodiment. A first direction X, a second direction Y and a third direction Z are orthogonal to each other in the drawing but may intersect at an angle other than 90°. In the present specification, a position on the leading end side of an arrow indicating the third direction Z may be referred to as "above" and a position on the side opposite to the leading end of the arrow may be referred to as "below" in some cases. In the case of "a second member above a first member" and the case of "a second member below a first member", the second member may be in contact with the first member or may be away from the first member. In addition, an observation position at which the display device DSP is observed is assumed to be located on the leading end side of the arrow indicating the third direction Z, and a view from this observation position toward an X-Y plane defined by the first direction X and the second direction Y is referred to as planar view.

The display device DSP comprises a first display panel PNL1, a second display panel PNL2, a polarizer PL, a first light source unit LU1, a second light source unit LU2 and a controller CNT. In the example illustrated, it is assumed that the display device DSP is located between a user U1 and a user U2, the user U1 observes the first display panel PNL1 and the user U2 observes the second display panel PNL2.

The first display panel PNL1, the second display panel PNL2 and the polarizer PL are in the form of flat plates parallel to the X-Y plane. The second display panel PNL2 is opposed to the first display PNL1. The polarizer PL is located between the first display panel PNL1 and the second display panel PNL2. The first display panel PNL1, the polarizer PL and the second display panel PNL2 are arranged in this order in the third direction Z. The first light source unit LU1 is opposed to a first end portion PNLE1 of the first display panel PNL1. The second light source unit LU2 is opposed to a second end portion PNLE2 of the second display panel PNL2. The first end portion PNLE1 and the second end portion PNLE2 extend in the first direction X. The second end portion PNLE2 overlaps the first end portion PNLE1. The first display panel PNL1 and the first light source unit LU1 are arranged in this order in the second direction Y. The second display panel PNL2 and the second light source unit LU2 are arranged in this order in the second direction Y.

The first light source unit LU1 and the second light source unit LU2 are similarly constituted, and the first light source unit LU1 will be described below. The first light source unit LU1 comprises, for example, light-emitting elements LS1 as light sources. The light-emitting elements LS1 are, for example, light-emitting diodes. The light-emitting elements LS1 are arranged in the first direction X. The light emitted from each of the light-emitting elements LS1 travels in a direction substantially opposite to the arrow indicating the second direction Y and enters the first display panel PNL1 from the first end portion PNLE1. Similarly, the second light source unit LU2 comprises light-emitting elements LS2. The light emitted from each of the light-emitting elements LS2 enters the second display panel PNL2 from the second end portion PNLE2. The first light source unit LU1 and the second light source unit LU2 may be constituted as one light source unit.

Both the first display panel PNL1 and the second display panel PNL2 are liquid crystal display panels using polymer dispersed liquid crystal. The first display panel PNL1 comprises a first main surface M1 and a second main surface M2, and a first liquid crystal layer LC1. The first main surface M1 and the second main surface M2 are, for example, surfaces parallel to the X-Y plane. The first main surface M1 is opposed to the user U1, and the second main surface M2 is opposed to the polarizer PL. The first liquid crystal layer LC1 is located between the first main surface M1 and the second main surface M2.

The second display panel PNL2 comprises a third main surface M3 and a fourth main surface M4, and a second liquid crystal layer LC2. The third main surface M3 and the fourth main surface M4 are, for example, surfaces parallel to the X-Y plane. The third main surface M3 is opposed to the polarizer PL, and the fourth main surface M4 is opposed to the user U2. The second liquid crystal layer LC2 is located between the third main surface M3 and the fourth main surface M4.

Each of the first liquid crystal layer LC1 and the second liquid crystal layer LC2 includes polymers 31 and liquid crystal molecules 32 as shown in an enlarged view in FIG. 1. In one example, the polymers 31 are liquid crystalline polymers. The polymers 31 are in the form of streaks extending in the first direction X. An extension direction ED1 of the polymers 31 in the first liquid crystal layer LC1 and an extension direction of the polymers 31 in the second liquid crystal layer LC2 are parallel to the X-Y plane as indicated by dashed arrows in the drawing. In addition, the extension directions ED1 and ED2 are parallel to the first direction X in the example illustrated. In addition, the first end portion PNLE1 extends in the extension direction ED1 and the second end portion PNLE2 extends in the extension direction ED2. The liquid crystal molecules 32 are dispersed in the gaps between the polymers 31 and are aligned such that major axes thereof extend in the first direction X which is the extension direction of the polymers 31. The polymers 31 and the liquid crystal molecules 32 have optical anisotropy or refractive index anisotropy. The liquid crystal molecules 32 may be positive liquid crystal molecules having positive dielectric anisotropy or may be negative liquid crystal molecules having negative dielectric anisotropy. In the case of negative liquid crystal molecules, it is preferable that a pretilt should be formed for the purpose of setting the alignment direction of the liquid crystal molecules when voltage is applied between a pixel electrode and a counter-electrode, a slit which sets the alignment direction of the liquid crystal molecules should be provided in at least one of a pixel electrode and a common electrode, or a projection should be provided on the liquid crystal layer side of a first substrate or a second substrate. The polymers 31 and the liquid crystal molecules 32 differ from each other in responsivity to an electric field. The responsivity of the polymers 31 to an electric field is lower than the responsivity of the liquid crystal molecules 32 to an electric field.

The first display panel PNL1 has a transparent state where the first display panel PNL1 transmits the light emitted from the first light source unit LU1 through the first liquid crystal layer LC1, and a scattering state where the first display panel PNL1 scatters the light emitted from the first light source unit LU1 in the first liquid crystal layer LC1. The transparent state and the scattering state will be described later in detail, but for example, the transparent state is formed in a state where voltage is not applied to the first liquid crystal layer LC1, and the scattering state is formed in a state where voltage is applied to the first liquid crystal layer LC1. In the scattering state, the first display panel PNL1 scatters the light emitted from the first light source unit LU1 and emits the light as display light DL1 from the first main surface M1 and the second main surface M2. The display light DL1 is linearly polarized light having a vibration plane parallel to the first direction X. In the present embodiment, linearly polarized light having a vibration plane parallel to the first direction X may be referred to as first linearly polarized light and linearly polarized light having a vibration plane parallel to the second direction Y may be referred to as second linearly polarized light in some cases.

Similarly, the second display panel PNL2 has a transparent state and a scattering state. In the scattering state, the second display panel PNL2 scatters the light emitted from the second light source unit LU2 and emits the light as display light DL2 from the third main surface M3 and the fourth main surface M4. The display light DL2 is the first linearly polarized light.

The polarizer PL has an absorption axis AA. The absorption axis AA indicates the vibration direction in the X-Y plane of the light absorbed in the polarizer PL. In the example illustrated, the absorption axis AA is parallel to the first direction X and the polarizer PL absorbs the first linearly polarized light. Although not shown in the drawing, the polarizer PL has a transmission axis orthogonal to the absorption axis AA in the X-Y plane. The transmission axis indicates the vibration direction in the X-Y plane of the light passing through the polarizer PL.

The extension directions ED1 and ED2 are parallel to the absorption axis AA. For this reason, most of the display light DL1 emitted from the second main surface M2, of the display light DL1 from the first display panel PNL1 is absorbed in the polarizer PL. Similarly, most of the display light DL2 emitted from the third main surface M3, of the display light DL2 from the second display panel PNL2 is absorbed in the polarizer PL. Therefore, the display light DL1 from the first display panel PNL1 is seen by the user U1 but is hardly seen by the user U2 who is observing the second display panel PNL2. In addition, the display light DL2 from the second display panel PNL2 is seen by the user U2 but is hardly seen by the user U1 who is observing the first display panel PNL1.

The controller CNT controls the first display panel PNL1, the second display panel PNL2, the first light source unit LU1 and the second light source unit LU2.

Each of the first display panel PNL1 and the second display panel PNL2 is not limited to the above-described example and can be any display panel which emits display light from both surfaces, and may be a self-luminous display panel comprising an organic electroluminescent (EL) element, an inorganic EL element or the like. Note that the display light to be emitted should preferably be linearly polarized light.

Next, a configuration example of the first display panel PNL1 will be described. The second display panel PNL2 is constituted in a manner similar to the first display panel PNL1, and detailed description thereof will be omitted here.

FIG. 2 is a plan view showing a configuration example of the first display panel PNL1 shown in FIG. 1. The first display panel PNL1 comprises a first substrate SUB1 and a second substrate SUB2. The first substrate SUB1 and the second substrate SUB2 overlap each other in planar view. The first display panel PNL1 comprises a display area DA on which an image is displayed and a frame-like non-display area NDA which surrounds the display area DA. The display area DA is located in an area in which the first substrate SUB1 and the second substrate SUB2 overlap each other. The first display panel PNL1 comprises n scanning lines G (G1 to Gn) and m signal lines S (S1 to Sm) in the display area DA. Each of n and m is a positive integer, and n may be equal to or different from m. The scanning lines G extend in the first direction X and are spaced apart and arranged in the second direction Y. The signal lines S extend in the second direction Y and are spaced apart and arranged in the first direction X.

The first substrate SUB1 has end portions E11 and E12 extending in the first direction X and end portions E13 and E14 extending in the second direction Y. The second substrate SUB2 has end portions E21 and E22 extending in the first direction X and end portions E23 and E24 extending in the second direction Y. In the example illustrated, the end portion E11 and the end portion E21, the end portion E13 and the end portion E23, and the end portion E14 and the end portion E24 overlap, respectively, in planar view. However, these end portions do not necessarily overlap. The end portion E22 is located between the end portion E12 and the display area DA in planar view. The first substrate SUB1 has an extension portion Ex between the end portion E12 and the end portion E22.

Wiring substrates F1 to F3 are each connected to the extension portion Ex and are arranged in this order in the first direction X. The wiring substrate F1 is provided with a gate driver GD1. The wiring substrate F2 is provided with a source driver SD. The wiring substrate F3 is provided with a gate driver GD2. The wiring substrates F1 to F3 may be replaced with one wiring substrate.

The signal lines S are drawn to the non-display area NDA and are connected to the source driver SD. The scanning lines G are drawn to the non-display area NDA and are connected to the gate driver GD1 and GD2. In the example illustrated, odd-numbered scanning lines G are drawn between the end portion E14 and the display area DA and are connected to the gate driver GD2. In addition, even-numbered scanning lines G are drawn between the end portion E13 and the display area DA and are connected to the gate driver GD1. The relationship in connection between the gate drivers GD1 and GD2 and the scanning lines G is not limited to the example illustrated.

FIG. 3 is a cross-sectional view showing the first display panel PNL1 shown in FIG. 2. Only main portions in the cross-section of the first display panel PNL1 in a Y-Z plane defined by the second direction Y and the third direction Z will be described here. The first display panel PNL1 comprises the first liquid crystal layer LC1 held between the first substrate SUB1 and the second substrate SUB2. The first substrate SUB1 and the second substrate SUB2 are bonded together by a sealant SL.

The light-emitting element LS1 in the first light source unit LU1 is connected to a wiring substrate F4. In the example illustrated, the light-emitting element LS1 is located between the extension portion Ex and the wiring substrate F4. In addition, the light-emitting element LS1 is located between the wiring substrates F1 to F3 and the second substrate SUB2. The light-emitting element LS1 has an emission portion EM1 opposed to the end portion E22. The light-emitting element LS1 emits light from the emission portion EM1 to the end portion E22. The emission portion EM1 may be in contact with the end portion E22. In addition, an air layer, an optical element or the like may be interposed between the emission portion EM1 and the end portion E22. The end portion E22 corresponds to an entrance portion which the light from the emission portion EM1 enters. In the example illustrated, the end portion E22 corresponds to the first end portion PNLE1 shown in FIG. 1. The light which has entered from the end portion E22 propagates through the first display panel PNL1 in the direction opposite to the arrow indicating the second direction Y as will be described later. The light-emitting element LS1 may be opposed to the end portions of both the first substrate SUB1 and the second substrate SUB2 and may be opposed to, for example, the end portions E11 and E21.

Figure 4:
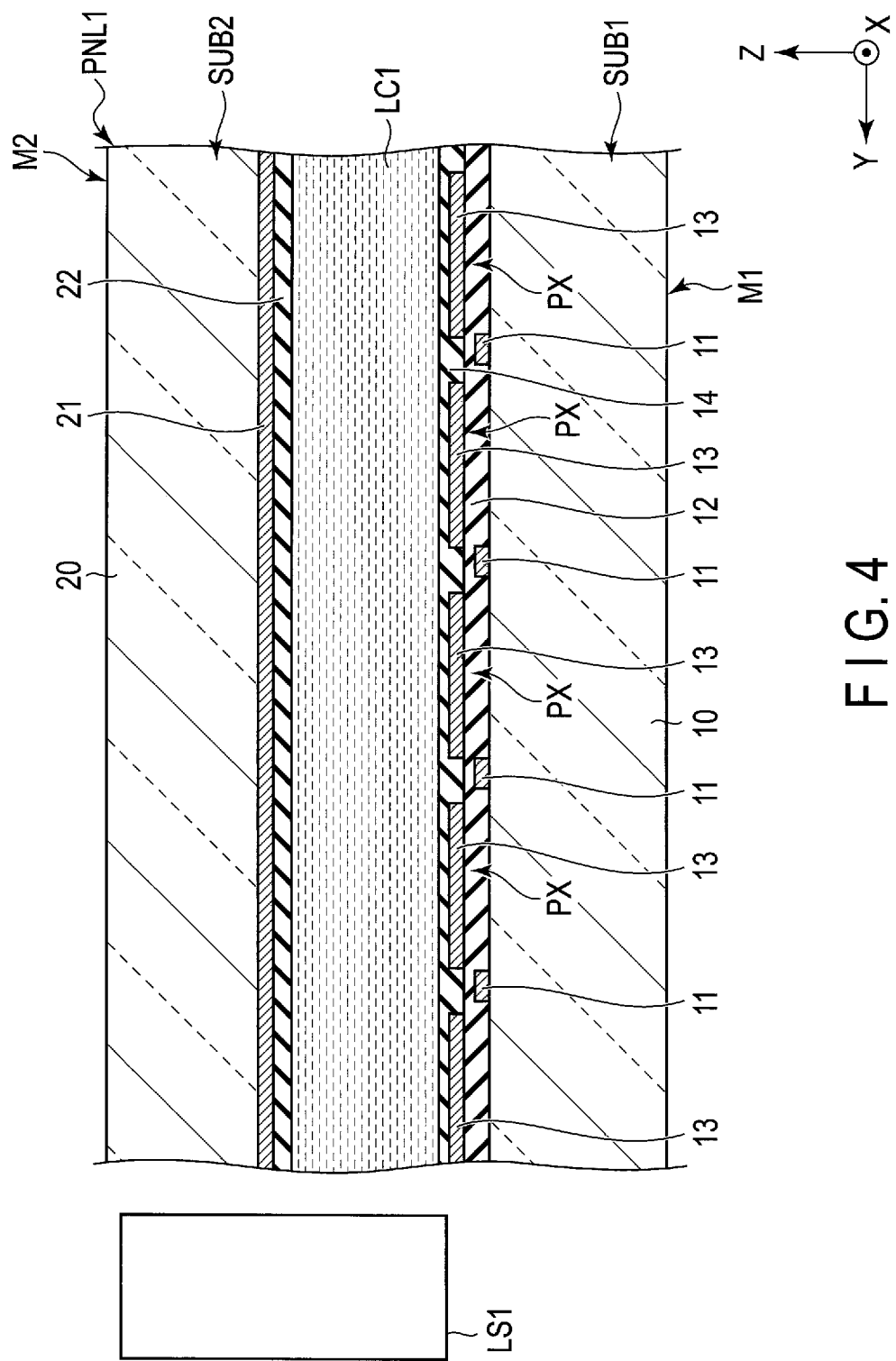
FIG. 4 is an enlarged cross-sectional view showing the first display panel PNL1 shown in FIG. 3.

FIG. 4 is an enlarged cross-sectional view showing the first display panel PNL1 shown in FIG. 3. The first substrate SUB1 comprises a transparent substrate 10, wiring lines 11, an insulating layer 12, pixel electrodes 13 and an alignment film 14. The second substrate SUB2 comprises a transparent substrate 20, a common electrode 21 and an alignment film 22. The transparent substrates 10 and 20 are insulating substrates such as glass substrates or plastic substrates. A surface of the transparent substrate 10 on the opposite side to the first liquid crystal layer LC1 corresponds to the first main surface M1. In addition, a surface of the transparent substrate 20 on the opposite side to the first liquid crystal layer LC1 corresponds to the second main surface M2. The wiring lines 11 are formed of a nontransparent metal material such as molybdenum, tungsten, aluminum, titanium or silver. The illustrated wiring lines 11 extend in the first direction X but may extend in the second direction Y. An insulating layer 12 is formed of a transparent insulating material. The pixel electrodes 13 and the common electrode 21 are formed of a transparent conductive material such as indium tin oxide (ITO) or indium zinc oxide (IZO). The pixel electrodes 13 are disposed respectively in pixels PX. The common electrode 21 is disposed across the pixels PX. The alignment films 14 and 22 may be horizontal alignment films having an alignment restriction force substantially parallel to the X-Y plane or may be vertical alignment films having an alignment restriction force substantially parallel to the third direction Z.

The first liquid crystal layer LC1 is located between the alignment film 14 and the alignment film 22. In one example, the alignment treatment direction of the alignment films 14 and 22 is parallel to the first direction X, and the alignment films 14 and 22 have an alignment restriction force in the first direction X. For example, the polymers 31 shown in FIG. 1 are obtained in the form of streaks extending in the first direction X by the polymerization of liquid crystalline monomers in a state of being aligned in the first direction X by the alignment restriction force of the alignment films 14 and 22. The first liquid crystal layer LC1 is located between the pixel electrodes 13 and the common electrode 21.

FIG. 5 is a diagram schematically showing the first liquid crystal layer LC1 in an off state. The drawing shows a cross-section of the first liquid crystal layer LC1 in an X-Z plane intersecting the second direction Y which is the traveling direction of the light from the first light source unit LU1. The off state corresponds to a state in which voltage is not applied to the first liquid crystal layer LC1 (for example, a state in which the potential difference between the pixel electrode 13 and the common electrode 21 is approximately zero). An optical axis Ax1 of the polymer 31 and an optical axis Ax2 of the liquid crystal molecule 32 are parallel to each other. In the example illustrated, the optical axis Ax1 and the optical axis Ax2 are parallel to the first direction X. The polymer 31 and the liquid crystal molecule 32 have substantially equal refractive index anisotropy. That is, the ordinary refractive index of the polymer 31 and the ordinary refractive index of the liquid crystal molecule 32 are substantially equal to each other, and the extraordinary refractive index of the polymer 31 and the extraordinary refractive index of the liquid crystal molecule 32 are substantially equal to each other. For this reason, there is hardly any refractive index difference between the polymer 31 and the liquid crystal molecule 32 in all directions including the first direction X, the second direction Y and the third direction Z.

FIG. 6 is a diagram schematically showing the first liquid crystal layer LC1 in an on state. The on state corresponds to a state in which voltage is applied to the first liquid crystal layer LC1 (for example, a state in which the potential difference between the pixel electrode 13 and the common electrode 21 is greater than or equal to a threshold value). As described above, the responsivity of the polymer 31 to an electric field is lower than the responsivity of the liquid crystal molecule 32 to an electric field. For example, the alignment direction of the polymer 31 (the extension direction ED1 shown in FIG. 1) hardly changes regardless of the presence of an electric field. On the other hand, the alignment direction of the liquid crystal molecule 32 changes in accordance with an electric field in a state in which high voltage which is greater than the threshold value is applied to the first liquid crystal layer LC1. That is, as illustrated in the drawing, the optical axis Ax1 is substantially parallel to the first direction X, whereas the optical axis Ax2 is inclined with respect to the first direction X. If the liquid crystal molecule 32 is a positive liquid crystal molecule, the liquid crystal molecule 32 is aligned such that a major axis thereof extends along an electric field. The electric field between the pixel electrode 13 and the common electrode 21 is formed in the third direction Z. Therefore, the liquid crystal molecule 32 is aligned such that the major axis thereof or the optical axis Ax2 extends in the third direction Z. That is, the optical axis Ax1 and the optical axis Ax2 intersect each other. Therefore, there is a large refractive index difference between the polymer 31 and the liquid crystal molecule 32 in all directions including the first direction X, the second direction Y and the third direction Z.

Figure 7:
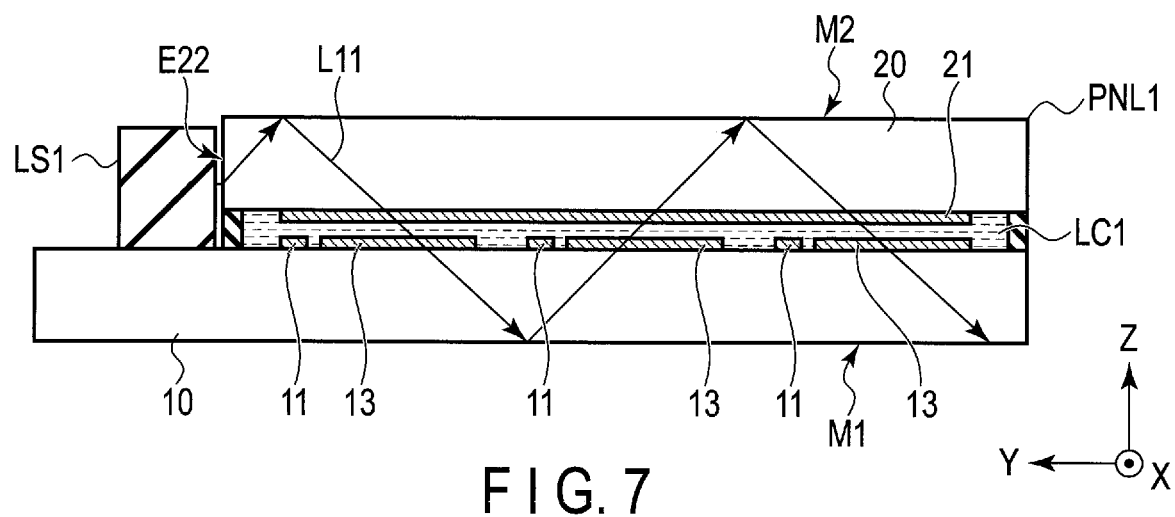
FIG. 7 is a cross-sectional view showing the first display panel PNL1 in a case where the first liquid crystal layer LC1 is in the off state.

FIG. 7 is a cross-sectional view showing the first display panel PNL1 in a case where the first liquid crystal layer LC1 is in the off state. A light beam L11 emitted from the light-emitting element LS1 enters the first display panel PNL1 from the end portion E22 and propagates through the transparent substrate 20, the first liquid crystal layer LC1, the transparent substrate 10 and the like. If the first liquid crystal layer LC1 is in the off state, the light beam L11 is transmitted and hardly scattered in the first liquid crystal layer LC1. The light beam L11 propagates through the first display panel PNL1 and hardly leaks from the first main surface M1 which is the lower surface of the transparent substrate 10 and the second main surface M2 which is the upper surface of the transparent substrate 20. That is, the first liquid crystal layer LC1 is in the transparent state.

Figure 8:
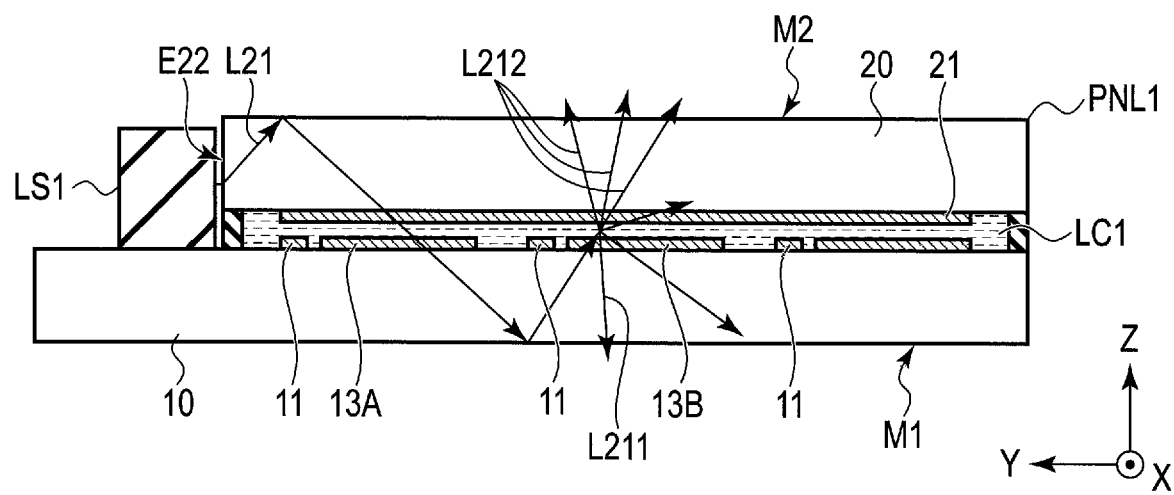
FIG. 8 is a cross-sectional view showing the first display panel PNL1 in a case where the first display panel PNL1 includes an area in which the first liquid crystal layer LC1 is in the on state.

FIG. 8 is a cross-sectional view showing the first display panel PNL1 in a case where the first display panel PNL1 includes an area in which the first liquid crystal layer LC1 is in the on state. A light beam L21 emitted from the light-emitting element LS1 enters the first display panel PNL1 from the end portion E22 and propagates through the transparent substrate 20, the first liquid crystal layer LC1, the transparent substrate 10 and the like. In the example illustrated, the first liquid crystal layer LC1 overlapping a pixel electrode 13A is in the off state, and the first liquid crystal layer LC1 overlapping a pixel electrode 13B is in the on state. For this reason, the light beam L21 is transmitted and hardly scattered in an area of the first liquid crystal layer LC1 which overlaps the pixel electrode 13A, while the light beam L21 is scattered in an area of the first liquid crystal layer LC1 which overlaps the pixel electrode 13B. Of the light beam L21, some scattered light beams L211 pass through the first main surface M1, some scattered light beams L212 pass through the second main surface M2, and the other scattered light beams propagate through the first display panel PNL1. These scattered light beams L211 and L212 correspond to the display light DL1 from the first display panel PNL1 shown in FIG. 1 and form the display image of the first display panel PNL1.

Next, a more specific configuration example will be described.

Figure 9A:
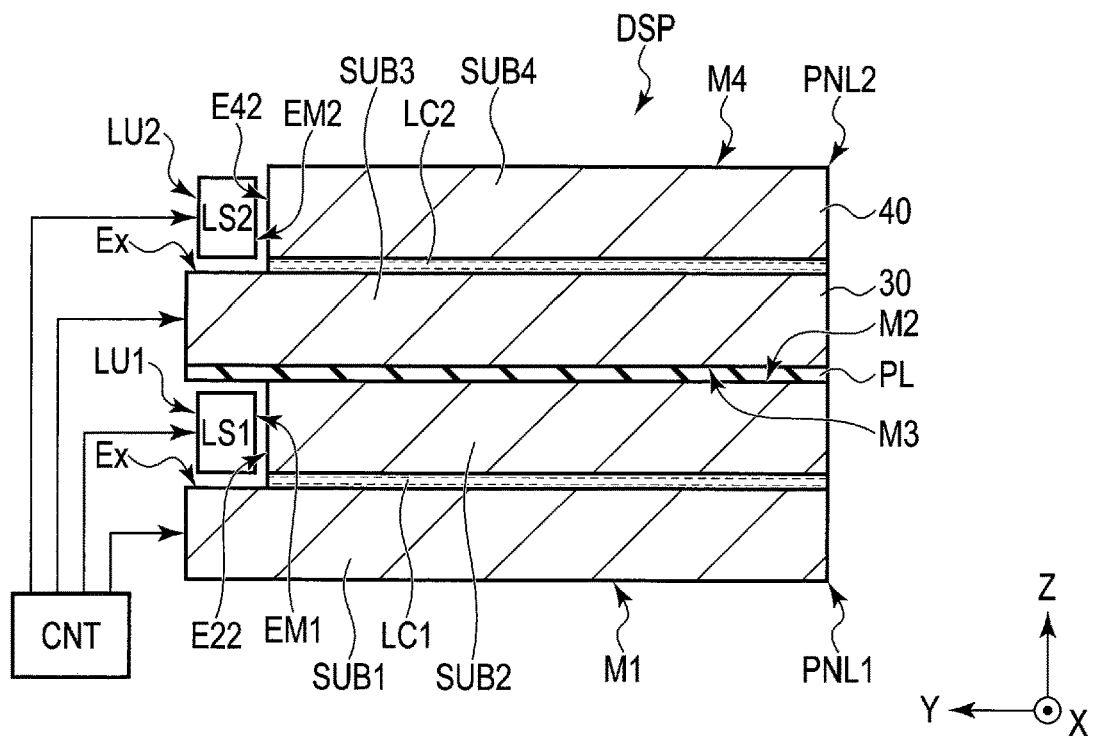
FIG. 9A is a cross-sectional view showing a configuration example of the display device DSP of the present embodiment.

FIG. 9A is a cross-sectional view showing a configuration example of the display device DSP of the present embodiment. As described above, the second display panel PNL2 is constituted in a manner similar to the first display panel PNL1. The second display panel PNL2 comprises a third substrate SUB3, a fourth substrate SUB4 and a second liquid crystal layer LC2. The fourth substrate SUB4 is opposed to the third substrate SUB3. The second liquid crystal layer LC2 is held between the third substrate SUB3 and the fourth substrate SUB4. The third substrate SUB3 is constituted in a manner similar to the first substrate SUB1, and the fourth substrate SUB4 is constituted in a manner similar to the second substrate SUB2. A transparent substrate 30 of the third substrate SUB3 has a third main surface M3 on the opposite side to the second liquid crystal layer LC2, and a transparent substrate 40 of the fourth substrate SUB4 has a fourth main surface M4 on the opposite side to the second liquid crystal layer LC2.

A light-emitting element LS2 in the second light source unit LU2 has an emission portion EM2 opposed to an end portion E42 of the fourth substrate SUB4. The light-emitting element LS2 emits light from the emission portion EM2 to the end portion E42.

The polarizer PL is located between the second main surface M2 and the third main surface M3. In the example illustrated, the polarizer PL is in contact with the second substrate SUB2 and the third substrate SUB3. In other words, there is one polarizer PL between the second substrate SUB2 and the third substrate SUB3. In one example, the polarizer PL is bonded to the second main surface M2 and the third main surface M3. In addition, there is no polarizer on the first main surface M1 or the fourth main surface M4.

The controller CNT controls the first display panel PNL1, the first light source unit LU1, the second display panel PNL2 and the second light source unit LU2. For example, the controller CNT supplies a first control signal including a first video signal to the first display panel PNL1. In addition, the controller CNT supplies a first light source control signal to the first light source unit LU1 in synchronization with the supply of the first control signal to the first display panel PNL1. On the other hand, the controller CNT supplies a second control signal including a second video signal to the second display panel PNL2. In addition, the controller CNT supplies a second light source control signal to the second light source unit LU2. The second video signal is, for example, a signal different from the first video signal. Accordingly, a display image based on the first video signal is displayed on the first display panel PNL1, and a display image based on the second video signal is displayed on the second display panel PNL2.

Figure 9B:
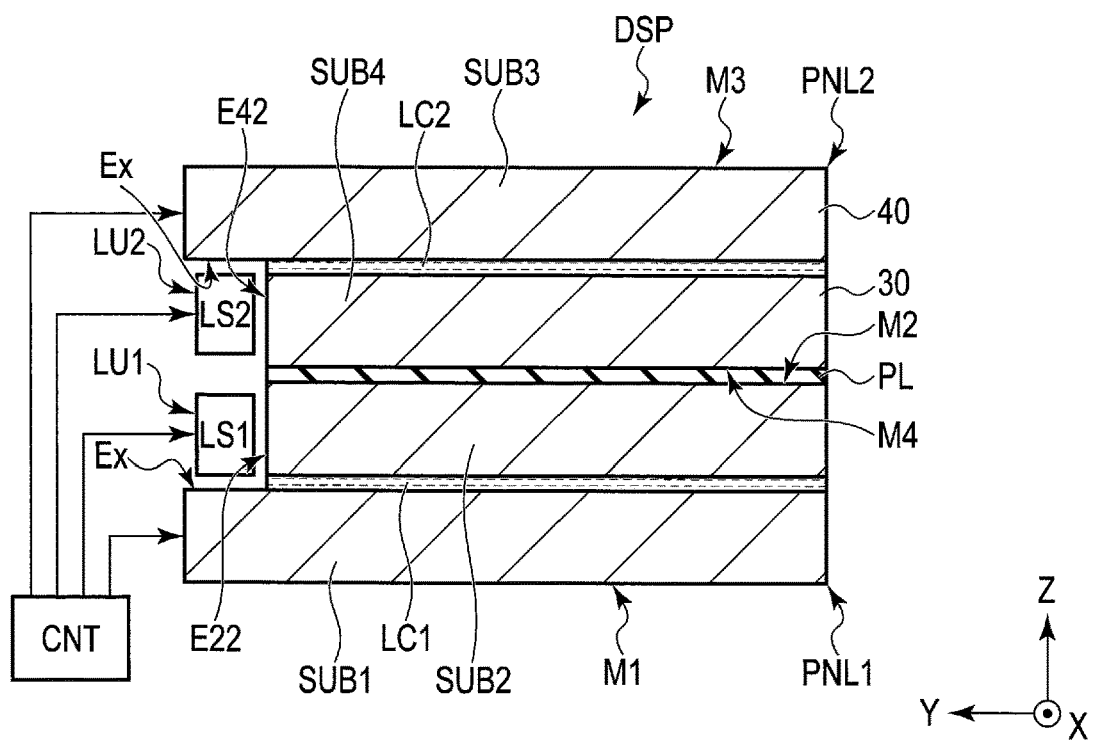
FIG. 9B is a cross-sectional view showing another configuration example of the display device DSP of the present embodiment.

FIG. 9B is a cross-sectional view showing another configuration example of the display device DSP of the present embodiment. The configuration example shown in FIG. 9B differs from the configuration example shown in FIG. 9A in that the fourth substrate SUB4 is located between the polarizer PL and the second liquid crystal layer LC2. The polarizer PL is located between the second substrate SUB2 and the fourth substrate SUB4, and in the example illustrated, the polarizer PL is in contact with the second main surface M2 and the fourth main surface M4.

The first light source unit LU1 and the second light source unit LU2 are adjacent to each other in the third direction Z between the first substrate SUB1 and the third substrate SUB3. The first light source unit LU1 and the second light source unit LU2 may be unified, and one light-emitting element LS may be opposed to both the end portion E22 and the end portion E42.

FIG. 9C is a cross-sectional view showing another configuration example of the display device DSP of the present embodiment. The configuration example shown in FIG. 9C differs from the configuration example shown in FIG. 9A in that the first light source unit LU1 is opposed to the first substrate SUB1 and the second substrate SUB2 and the second light source unit LU2 is opposed to the third substrate SUB3 and the fourth substrate SUB4. In the example illustrated, the light-emitting element LS1 is opposed to the end portion E11 and the end portion E21. In addition, the light-emitting element LS2 is opposed to the end portion E31 and the end portion 541. The first light source unit LU1 and the second light source unit LU2 may be unified, and one light-emitting element LS may be opposed to the end portion E11, the end portion E21, the end portion E31 and the end portion E41.

Figure 10:
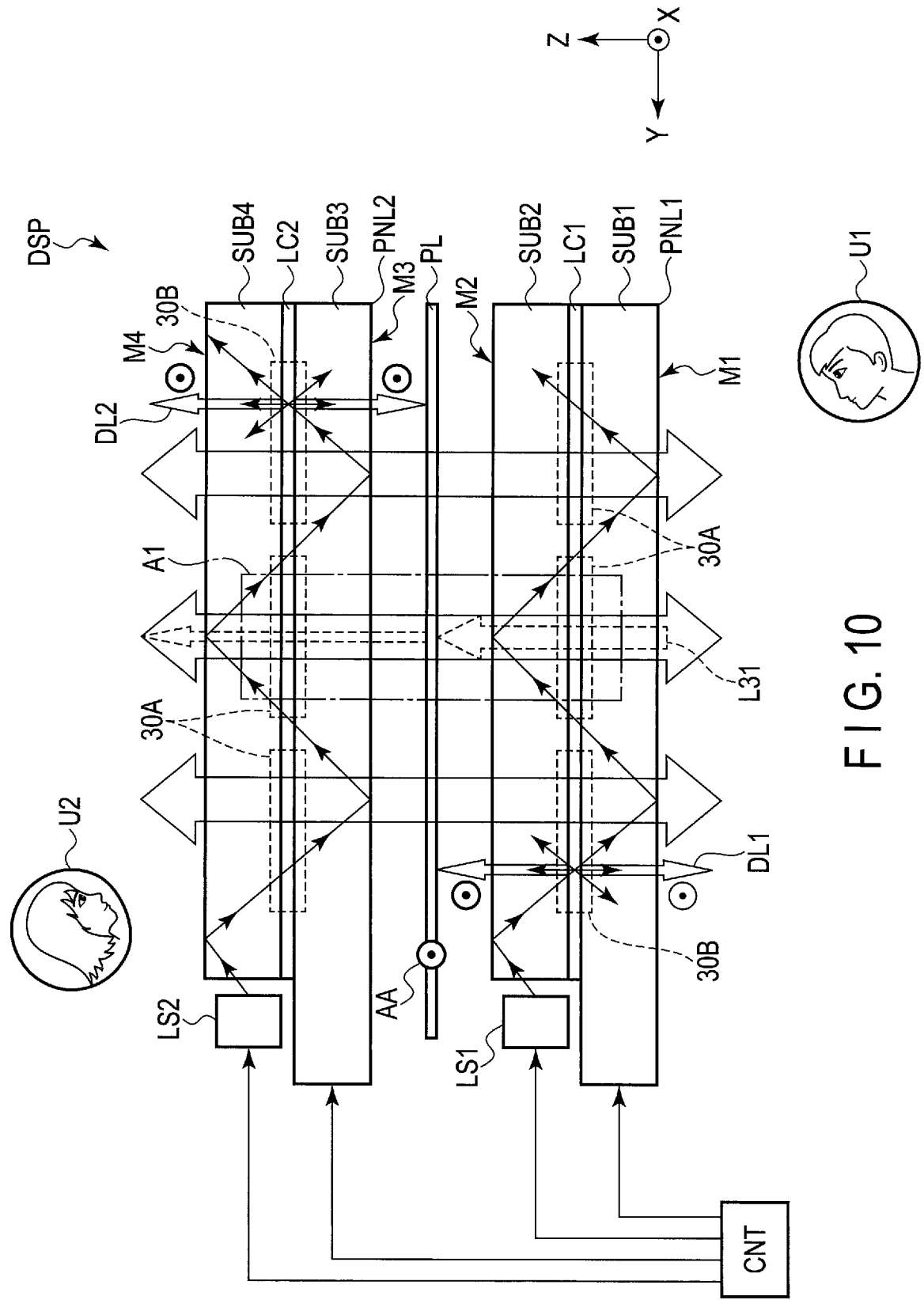
FIG. 10 is an explanatory diagram showing the display mode of the display device DSP shown in FIG. 9A.

FIG. 10 is an explanatory diagram showing the display mode of the display device DSP shown in FIG. 9A. Each of the first liquid crystal layer LC1 and the second liquid crystal layer LC2 has an off area 30A in the off state and an on area 30B in the on state which are indicated by dashed lines in the drawing. In the off area 30A, the optical axis Ax1 of the polymer 31 and the optical axis Ax2 of the liquid crystal molecule 32 are parallel to the first direction X as described above with reference to FIG. 5. In the on area 30B, the optical axis Ax1 of the polymer 31 is parallel to the first direction X and the optical axis Ax2 of the liquid crystal molecule 32 is parallel to the third direction Z as described above with reference to FIG. 6.

In the example illustrated, the on area 30B of the first liquid crystal layer LC1 is opposed to the off area 30A of the second liquid crystal layer LC2, and the on area 30B of the second liquid crystal layer LC2 is opposed to the off area 30A of the first liquid crystal layer LC1. Note that the on area 30B of the first liquid crystal layer LC1 and the on area 30B of the second liquid crystal layer LC2 may be opposed to each other. That is, in the first display panel PNL1 and the second display panel PNL2 which overlap each other in the third direction Z, the on area 30B of one panel may overlap the off area 30A of the other panel or the on area 30B of one panel may overlap the on area 30B of the other panel.

The light-emitting element LS1 and the first display panel PNL1 are controlled by the controller CNT. The first display panel PNL1 is controlled based on the first video signal from the controller CNT, transmits the light from the light-emitting element LS1 in the off area 30A, and scatters the light from the light-emitting element LS1 in the on area 30B. The light scattered in the on area 30B is the first linearly polarized light and is emitted from the first main surface M1 and the second main surface M2. The light emitted from the first main surface M1 forms the display image of the first display panel PNL1 and is seen by the user U1 as the display light DL1. On the other hand, the light emitted from the second main surface M2 is absorbed in the polarizer PL and is hardly transmitted through the second display panel PNL2. That is, the display image of the first display panel PNL1 is hardly seen by the user U2.

Similarly, the second display panel PNL2 is controlled based on the second video signal from the controller CNT, transmits the light from the light-emitting element LS2 in the off area 30A, and scatters the light from the light-emitting element LS2 in the on area 30B. The light scattered in the on area 30B is the first linearly polarized light and is emitted from the third main surface M3 and the fourth main surface M4. The light emitted from the fourth main surface M4 forms the display image of the second display panel PNL2 and is seen by the user U2 as the display light DL2. On the other hand, the light emitted from the third main surface M3 is absorbed in the polarizer PL and is hardly transmitted through the first display panel PNL1. That is, the display image of the second display panel PNL2 is hardly seen by the user U1.

Meanwhile, attention is turned to an area A1 in which the off area 30A of the first display panel PNL1 and the off area 30A of the second display panel PNL2 overlap each other in the third direction Z.

A natural light beam L31 which has entered the first display panel PNL1 from the first main surface M1 passes through the second main surface M2 and is hardly scattered or absorbed in the first display panel PNL1. After the natural light beam L31 passed through the first display panel PNL1, the vibration component parallel to the absorption axis AA is absorbed in the polarizer PL. For this reason, the transmittance of the natural light beam L31 through the polarizer PL is about 50%. After the natural light beam L31 passed through the polarizer PL, the natural light beam L31 enters the second display panel PNL2 from the third main surface M3, and subsequently the natural light beam L31 passes through the fourth main surface. M4 and is hardly scattered or absorbed in the second display panel PNL2. That is, a natural light beam which has entered the display device DSP is transmitted through the display device DSP at a transmittance of about 50% in the area A1. A natural light beam which has entered the second display panel PNL2 from the fourth main surface M4 is similarly transmitted through the display device DSP at a transmittance of 50% in the area A1.

In an area in which the off area 30A and the on area 30B overlap each other in the third direction Z, a natural light beam which has entered the display device DSP is only partly scattered in the on area 30B but is transmitted through the display device DSP at a transmittance of about 50% as is the case with the area A1.

FIG. 11 is a diagram showing an example of the display image I20 of the second display panel PNL2 seen by the user U2. FIG. 12 is a diagram showing an example of the display image I10 of the first display panel PNL1 seen by the user U1.

The first display panel PNL1 displays the display image I10 on an area A10. In the example illustrated, the display image I10 includes a letter image I11 and a background image I12 which surrounds the letter image I11. The letter image I11 is displayed in a color different from that of the background image I12.

Similarly, the second display panel PNL2 displays the display image I20 on an area A20. In the example illustrated, the display image I20 includes a letter image I21 and a background image I22 which surrounds the letter image I21, and the letter image I21 is displayed in a color different from that of the background image I22. The display images I10 and I20 are not limited to letter images and may contain photographs, illustrations, moving images and the like.

The display image I20 is hardly displayed on the area A11 of the first display panel PNL1 which overlaps the area A20 of the second display panel PNL2. Therefore, the user U1 can see the display image I10 and hardly sees the mirror image (horizontally flipped image) of the display image I20, and the visibility of the display image I10 can be improved. In addition, since the area A11 is an area which allows natural light to pass, the user U1 can see the user U2 on the other side through the display device DSP in the area A11. In addition, since the area between the area A10 and the area A11 corresponds to the area A1 shown in FIG. 10, the user U1 can also see the user U2 in this area. Furthermore, since the background image I12 which surrounds the letter image I11 is displayed in a color different from that of the letter image I11 in the display image I10, the transmittance of the surrounding of the letter image I11 is reduced, and the visibility of the letter image I11 can be improved.

Similarly, the display image I10 is hardly displayed on the area A21 of the second display panel PNL2 which overlaps the area A10 of the first display panel PNL1. Therefore, the user U2 can see the display image I20 and hardly sees the mirror image of the display image I10, and the visibility of the display image I20 can be improved. In addition, the user U2 can see the user U1 in the area A21 and the area between the area A20 and the area A21. Furthermore, the visibility of the letter image I21 in the display image I20 can be improved.

In one example, the second display panel PNL2 displays the letter image I21 corresponding to a question from the user U1. On the other hand, the first display panel PNL1 displays the letter image I11 corresponding to an answer from the user U2. As a result, the users facing each other can communicate with each other via the display device DSP.

Next, another configuration example of the present embodiment will be described. Regarding the configuration example which will be described below, differences from the above-described configuration example will be mainly described.

Figure 13:
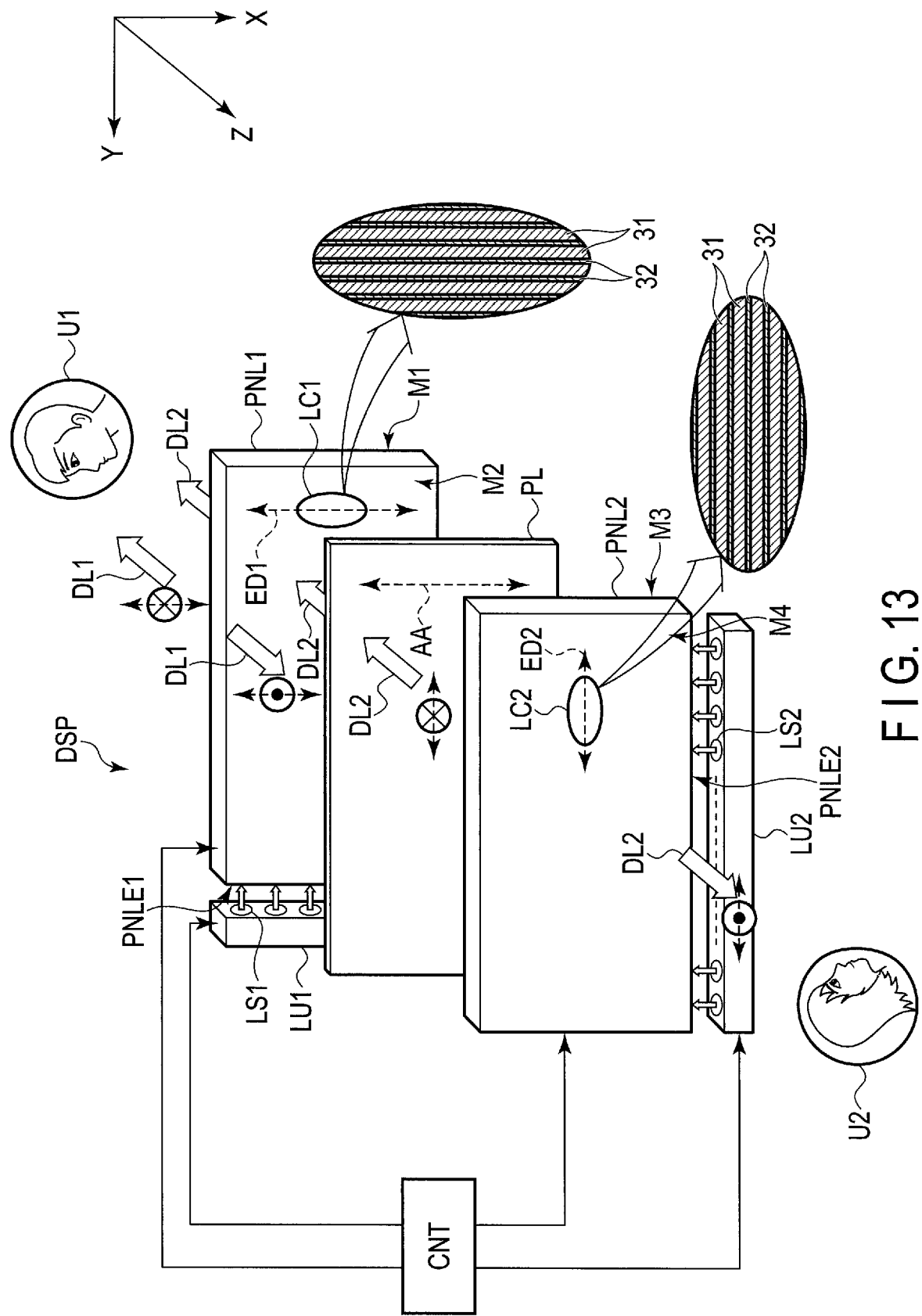
FIG. 13 is a perspective view showing another configuration example of the display device DSP of the present embodiment.

FIG. 13 is a perspective view showing another configuration example of the display device DSP of the present embodiment. The configuration example shown in FIG. 13 differs from the configuration example shown in FIG. 1 in that the extension direction ED1 of the polymers 31 of the first liquid crystal layer LC1 intersects the extension direction ED2 of the polymers 31 of the second liquid crystal layer LC2. In the example illustrated, the extension direction ED1 is parallel to the first direction X and is parallel to the absorption axis AA of the polarizer PL. In addition, the extension direction ED2 is parallel to the second direction Y and intersects or orthogonally intersects the absorption axis AA.

The second display panel PNL2 and the second light source unit LU2 are arranged in this order in the first direction X. In the second light source unit LU2, the light-emitting elements LS2 are arranged in the second direction Y. The second end portion PNLE2 opposed to the second light source unit LU2 extends in the second direction Y which is the extension direction ED2. The first end portion PNLE1 opposed to the first light source unit LU1 extends in the first direction X which is the extension direction ED1, and the light-emitting elements LS1 are arranged in the first direction X.

In the first display panel PNL1, the display light DL1 emitted from the first main surface M1 and the second main surface M2 is the first linearly polarized light. The display light DL1 from the first main surface M1 forms the display image of the first display panel PNL1. On the other hand, the display light DL1 from the second main surface M2 is absorbed in the polarizer PL and does not pass through the second display panel PNL2 as is the case with the configuration example shown in FIG. 1.

In the second display panel PNL2, the display light DL2 emitted from the third main surface M3 and the fourth main surface M4 is the second linearly polarized light. The display light DL2 from the fourth main surface M4 forms the display image of the second display panel PNL2. On the other hand, the display light DL2 from the third main surface M3 passes through the polarizer PL and further passes through the first display panel PNL1.

Therefore, the display light DL1 from the first display panel PNL1 is seen by the user U1 but is hardly seen by the user U2. In addition, the display light DL2 from the second display panel PNL2 is seen by both the user U1 and the user U2.

Figure 14:
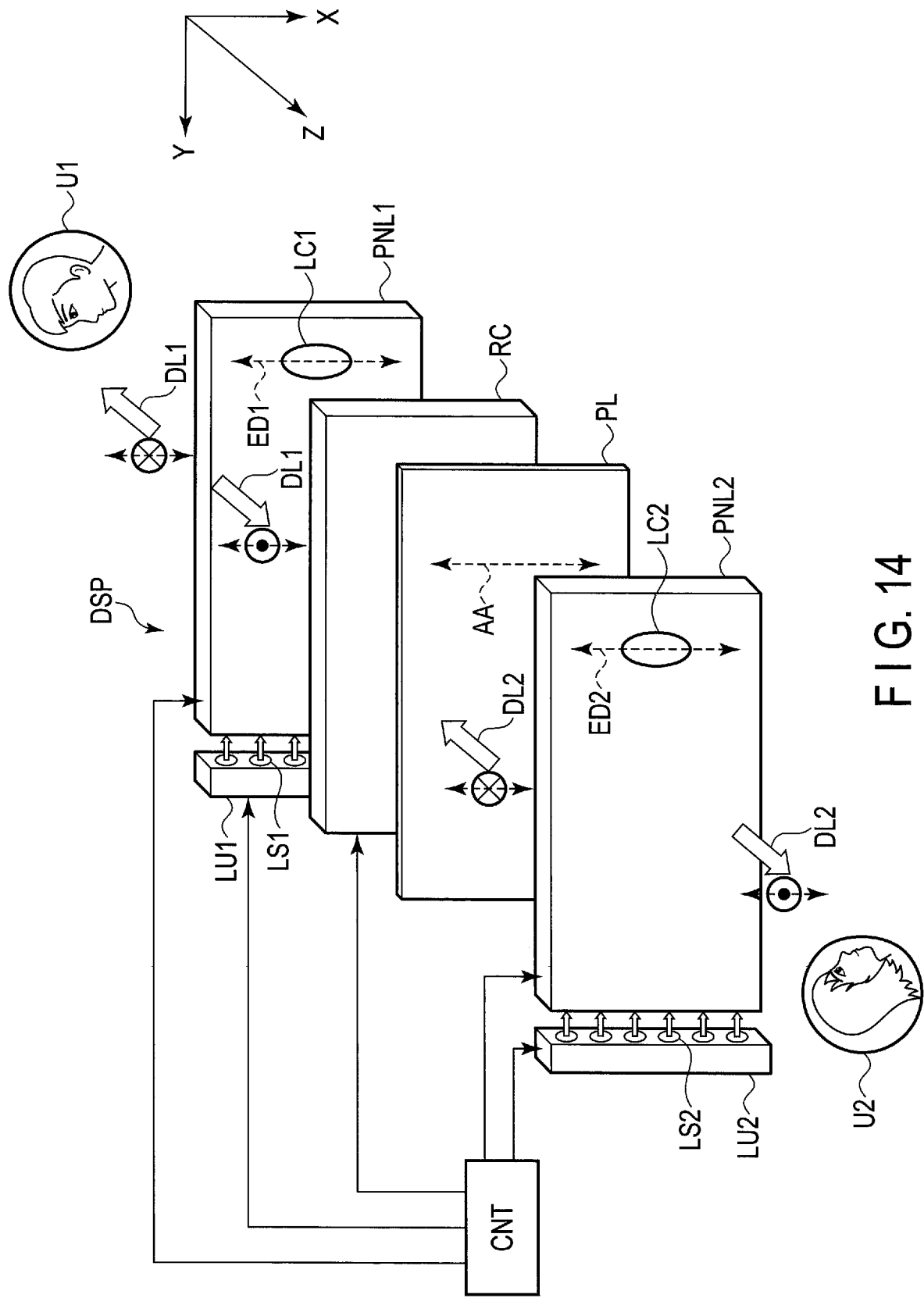
FIG. 14 is a perspective view showing another configuration example of the display device DSP of the present embodiment.

FIG. 14 is a perspective view showing another configuration example of the display device DSP of the present embodiment. The configuration example shown in FIG. 14 differs from the configuration example shown in FIG. 1 in that a retardation control element RC is disposed between the first display panel PNL1 and the polarizer PL. The retardation control element RC has the function of imparting retardation to the light passing therethrough, the function of changing the retardation which the retardation control element RC imparts, and the function of changing the vibration plane of the light passing therethrough in the X-Y plane. The retardation control element RC is controlled by the controller CNT and has a modulating mode in which the retardation control element RC imparts retardation to the linearly polarized light passing therethrough and a non-modulating mode in which the retardation control element RC maintains the vibration plane of the linearly polarized light passing therethrough. The modulating mode and the non-modulating mode will be described later.

Figure 15:
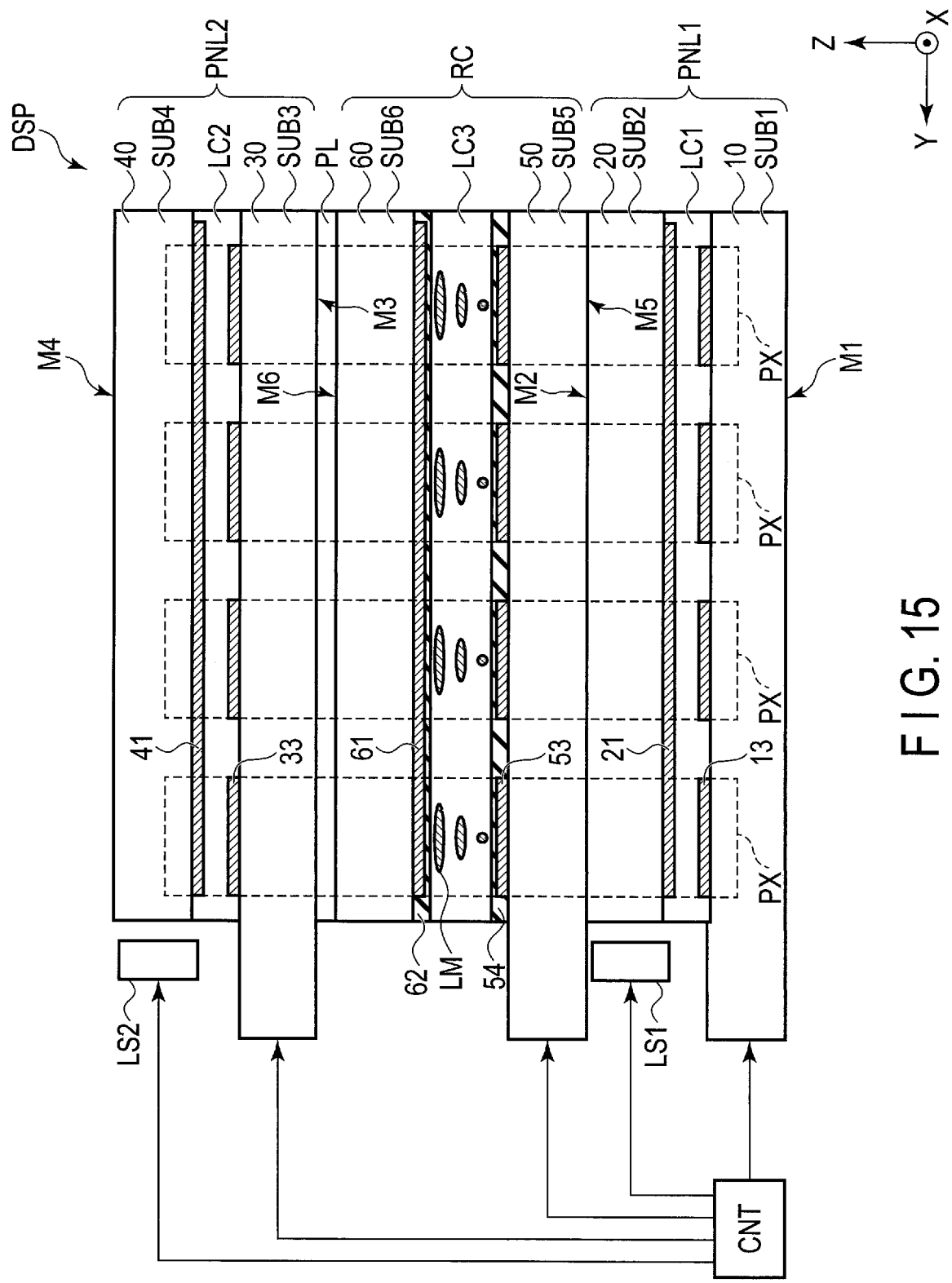
FIG. 15 is a cross-sectional view showing the display device DSP of the present embodiment shown in FIG. 14.

FIG. 15 is a cross-sectional view showing the display device DSP of the present embodiment shown in FIG. 14. Each of the elements will be described below. The first display panel PNL1 holds the first liquid crystal layer LC1 between the first substrate SUB1 and the second substrate SUB2. The first substrate SUB1 comprises the transparent substrate 10 and the pixel electrodes 13. The second substrate SUB2 comprises the transparent substrate 20 and the common electrode 21. The common electrode 21 is opposed to the pixel electrodes 13 via the first liquid crystal layer LC1.

The second display panel PNL2 holds the second liquid crystal layer LC2 between the third substrate SUB3 and the fourth substrate SUB4. The third substrate SUB3 comprises the transparent substrate 30 and pixel electrodes 33. The fourth substrate SUB4 comprises the transparent substrate 40 and a common electrode 41. The common electrode 41 is opposed to the pixel electrodes 33 via the second liquid crystal layer LC2. For example, the pixel electrodes 13 and 33 are disposed respectively in pixels PX, and the pixel electrodes 33 are located directly above the pixel electrodes 13. The pixel electrodes 33 and the common electrode 41 are formed of a transparent conductive material such as ITO or IZO.

The retardation control element RC is composed of, for example, a liquid crystal element. That is, the retardation control element RC comprises a fifth substrate SUB5, a sixth substrate SUB6 and a third liquid crystal layer LC3 held between the fifth substrate SUB5 and the sixth substrate SUB6. The fifth substrate SUB5 comprises a transparent substrate 50, first control electrodes 53 and an alignment film 54. The transparent substrate 50 has a fifth main surface M5 on the opposite side to the third liquid crystal layer LC3. The fifth main surface M5 is in contact with the second main surface M2. That is, there is no optical element such as a polarizer between the second substrate SUB2 and the fifth substrate SUB5. The sixth substrate SUB6 comprises a transparent substrate 60, a second control electrode 61 and an alignment film 62. The transparent substrate 60 has a sixth main surface M6 on the opposite side to the third liquid crystal layer LC3. The sixth main surface M6 is in contact with the polarizer PL. That is, there is one polarizer PL between the third substrate SUB3 and the sixth substrate SUB6.

The second control electrode 61 is opposed to the first control electrodes 53 via the third liquid crystal layer LC3. The first control electrodes 53 and the second control electrode 61 are formed of a transparent conductive material such as ITO or IZO. The first control electrodes 53 and the second control electrode 61 apply voltage to the third liquid crystal layer LC3 based on the control by the controller CNT. The alignment films 54 and 62 are, for example, horizontal alignment films. In one example, the alignment treatment direction of the alignment film 54 is parallel to the first direction X, and the alignment treatment direction of the alignment film 62 is parallel to the second direction Y.

The third liquid crystal layer LC3 is formed of, for example, a liquid crystal material having positive dielectric anisotropy. Liquid crystal molecules LM contained in the third liquid crystal layer LC3 are in 90° twisted alignment in a state where voltage is not applied. That is, the liquid crystal molecules LM near the first control electrodes 53 are initially aligned such that major axes thereof extend in the first direction X, and the liquid crystal molecules LM near the second control electrode 61 are initially aligned such that major axes thereof extend in the second direction Y. In addition, the liquid crystal molecules LM are aligned such that major axes thereof extend along an electric field in a state where voltage is generated. For example, a state where voltage is not applied to the third liquid crystal layer LC3 corresponds to the modulating mode, and a state where voltage is applied to the third liquid crystal layer LC3 corresponds to the non-modulating mode.

The retardation control element RC can control the retardation for each of the pixels in each of the first display panel PNL1 and the second display panel PNL2. That is, the first control electrodes 53 are located directly below the pixel electrodes 33 and are located above the pixel electrodes 13. In other words, the pixel electrode 13, the first control electrode 53 and the pixel electrode 33 are arranged in this order in the third direction Z in each of the pixels PX.

The retardation control element RC only needs to have the function of imparting a predetermined retardation or not imparting a predetermined retardation to the light passing therethrough, and does not necessarily have the above-described configuration.

FIG. 16 is an explanatory diagram showing the display mode of the display device DSP shown in FIG. 15.

In the second display panel PNL2, the display light DL2 emitted from the third main surface M3 and the fourth main surface M4 is the first linearly polarized light. The display light DL2 from the fourth main surface M4 forms the display image of the second display panel PNL2. On the other hand, the display light DL2 from the third main surface M3 is absorbed in the polarizer PL.

In the first display panel PNL1, the display light DL1 emitted from the first main surface M1 and the second main surface M2 is the first linearly polarized light. The display light DL1 from the first main surface M1 forms the display image of the first display panel PNL1. On the other hand, the display light DL1 from the second main surface M2 enters the retardation control element RC.

In the retardation control element RC, an electric field in the third direction Z is formed in an area in which a first control electrode 532 and the second control electrode 61 are opposed to each other, and therefore the liquid crystal molecules LM are vertically aligned such that major axes thereof extend in the third direction Z. No electric field is formed in areas where first control electrodes 531 and 533 are opposed to the second control electrode 61, respectively, and therefore the liquid crystal molecules LM are maintained in the initially aligned state and are in the twisted alignment.

The first linearly polarized light which enters the area overlapping the first control electrode 531, of the first linearly polarized light which enters from the fifth main surface M5 of the retardation control element RC is influenced by the liquid crystal molecules LM in the twisted alignment, and the vibration plane (polarization plane) of the first linearly polarized light is rotated, and after the first linearly polarized light passes through the third liquid crystal layer LC3, the first linearly polarized light is converted into the second linearly polarized light (modulating mode). On the other hand, the first linearly polarized light which enters the area overlapping the first control electrode 532 is hardly influenced by the liquid crystal molecules LM in the vertical alignment and passes through the third liquid crystal layer LC3 while the vibration plane is being maintained (non-modulating mode). That is, the area overlapping the first control electrode 531 has the function of imparting retardation to the incident light and imparts retardation of, for example, about λ/2 to the incident light. Here, λ is the wavelength of the incident light. In the area in the modulating mode, the vibration plane is rotated about 90° if the incident light is linearly polarized light. In addition, the retardation is not imparted to the incident light in the area overlapping the first control electrode 532. The incident light is transmitted and hardly modulated in the area in the non-modulating mode.

The second linearly polarized light of the display light DL1 which passes through the sixth main surface M6 of the retardation control element RC passes through the polarizer PL and passes through the second display panel PNL2. In addition, the first linearly polarized light of the display light DL1 is absorbed in the polarizer PL.

Therefore, the display light DL2 from the second display panel PNL2 is seen by the user U2 but is hardly seen by the user U1. In addition, the display light DL1 from the first display panel PNL1 is seen by both the user U1 and the user U2 in the modulating mode, whereas the display light DL1 from the first display panel PNL1 is seen by the user U1 but is not seen by the user U2 in the non-modulating mode. That is, according to the display device DSP, the display image on the first display panel PNL1 is seen by both the user U1 and the user U2 or only by the user U1 in a switchable manner.

FIG. 17 is a perspective view showing another configuration example of the display device DSP of the present embodiment. The configuration example shown in FIG. 17 differs from the configuration example shown in FIG. 1 in that the polarizer PL is replaced with a transmittance control element TC. The extension direction ED1 of the polymers in the first liquid crystal layer LC1 and the extension direction ED2 of the polymers in the second liquid crystal layer LC2 are parallel to each other.

The transmittance control element TC is located between the first display panel PNL1 and the second display panel PNL2. The transmittance control element TC has the function of changing the transmittance of the light passing therethrough (light control function). For example, an electrochemical reaction element such as a guest-host liquid crystal element, a suspended particle device (SPD), an electrochromic element or an electrodeposition element is suitable for the transmission control element TC. In one example, the transmittance control element TC is controlled by the controller CNT and has an absorbing mode in which the transmittance control element TC absorbs linearly polarized light which has entered and a transmitting mode in which the transmittance control element TC transmits the linearly polarized light which has entered. The absorbing mode and the transmitting mode will be described later.

Figure 18:
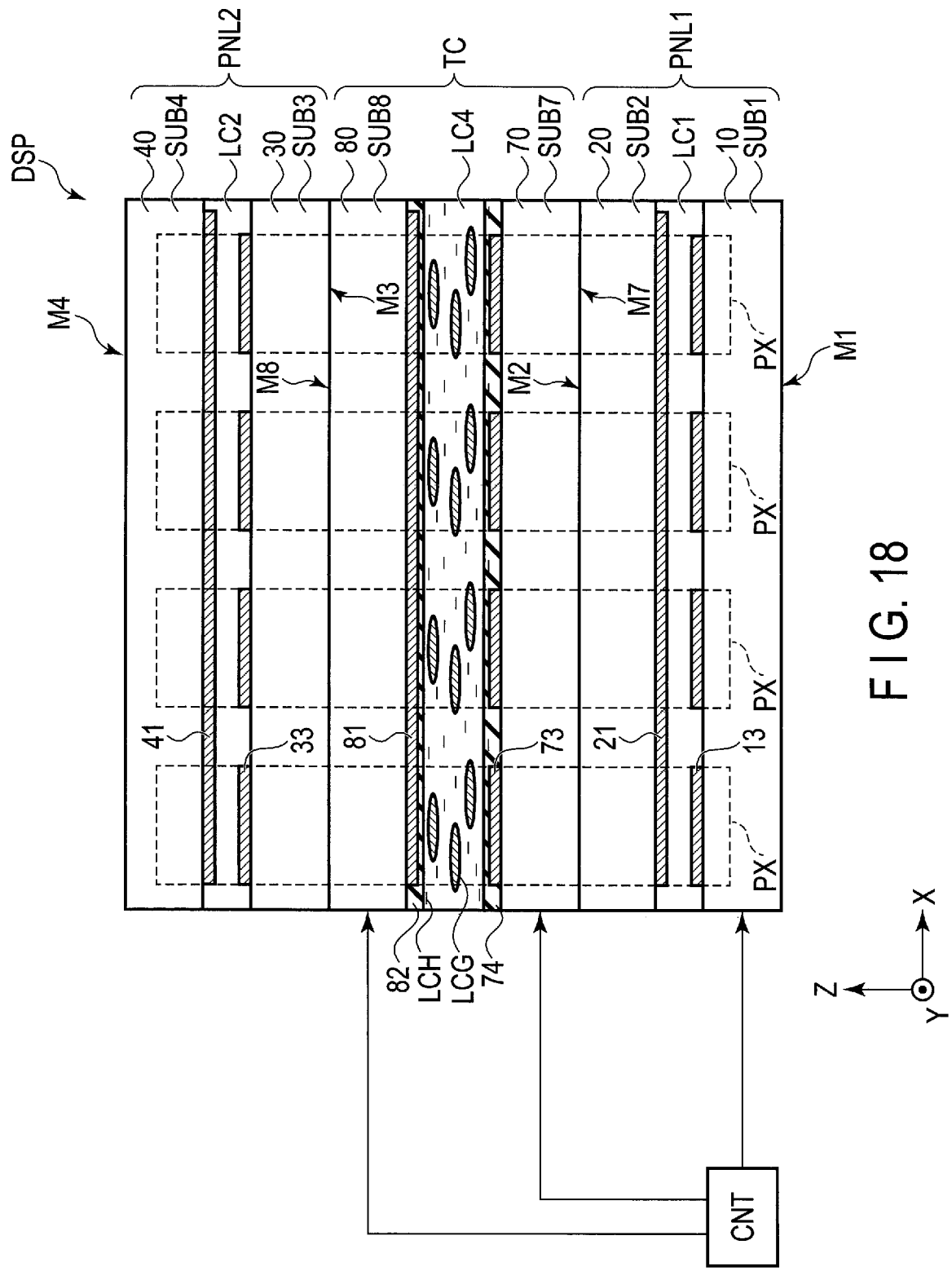
FIG. 18 is a cross-sectional view showing the display device DSP of the present embodiment shown in FIG. 17.

FIG. 18 is a cross-sectional view showing the display device DSP of the present embodiment shown in FIG. 17. The description of the first display panel PNL1 and the second display panel PNL2 will be omitted. A configuration example in which the transmittance control element TC is composed of a guest-host liquid crystal element will be described below.

The transmittance control element TC comprises a seventh substrate SUB7, an eighth substrate SUB8 and a fourth liquid crystal layer LC4 held between the seventh substrate SUB7 and the eighth substrate SUB8. The seventh substrate SUB7 comprises a transparent substrate 70, a plurality of third control electrodes 73 and an alignment film 74. The transparent substrate 70 has a seventh main surface M7 on the opposite side to the fourth liquid crystal layer LC4. The seventh main surface M7 is in contact with the second main surface M2. In other words, there is no optical element such as a polarizer between the second substrate SUB2 and the second substrate SUB7. The eighth substrate SUB8 comprises a transparent substrate 80, a fourth control electrode 81 and an alignment film 82. The transparent substrate 80 has an eighth main surface M8 on the opposite side to the fourth liquid crystal layer LC4. The eighth main surface M8 is in contact with the third main surface M3. In other words, there is no optical element such as a polarizer between the third substrate SUB3 and the eighth substrate SUB8.

The fourth control electrode 81 is opposed to the third control electrodes 73 via the fourth liquid crystal layer LC4. The third control electrodes 73 and the fourth control electrode 81 are formed of a transparent conductive material such as ITO or IZO. The third control electrodes 73 and the fourth control electrode 81 apply voltage to the fourth liquid crystal layer LC4 based on the control by the controller CNT. The alignment films 74 and 82 are, for example, horizontal alignment films. In one example, the alignment treatment directions of the alignment films 74 and 82 are parallel to the first direction X.

The fourth liquid crystal layer LC4 is a guest-host liquid crystal layer. The fourth liquid crystal layer LC4 includes dyes (for example, dichroic dyes) LCG having anisotropy in the absorptivity (absorbance) of visible light as guest molecules, and liquid crystal molecules LCH of nematic liquid crystal as host molecules. The dye has the absorption capability of absorbing a polarization component which vibrates along the major axis of the molecule more strongly than a polarization component vibrating along the minor axis of the molecule. In the fourth liquid crystal layer LC4, the dyes LCG can be aligned in a desired direction along with the alignment of the liquid crystal molecules LCH.

In one example, the fourth liquid crystal layer LC4 is formed of a liquid crystal material having positive dielectric anisotropy. The liquid crystal molecules LCH contained in the fourth liquid crystal layer LC4 are initially aligned in the first direction X by the alignment restriction forces of the alignment films 74 and 82 in a state where voltage is not applied. The dyes LCG are initially aligned in the first direction X along with the alignment of the liquid crystal molecules LCH. In addition, the liquid crystal molecules LCH are aligned such that major axes thereof extend along an electric field in a state where voltage is generated, and similarly, the dyes LCG are aligned such that major axes thereof extend parallel to the major axes of the liquid crystal molecules LCH. For example, a state where voltage is not applied to the fourth liquid crystal layer LC4 corresponds to the absorbing mode, and a state where voltage is applied to the fourth liquid crystal layer LC4 corresponds to the transmitting mode.

The transmittance control element TC can control the transmittance of each of the pixels in each of the first display panel PNL1 and the second display panel PNL2. That is, the third control electrodes 73 are located directly below the pixel electrodes 33 and are located directly above the pixel electrodes 13. In other words, the pixel electrode 13, the third control electrode 73 and the pixel electrode 33 are arranged in this order in the third direction Z in each of the pixels PX.

The fourth liquid crystal layer LC4 may be formed of a liquid crystal material having negative dielectric anisotropy, and the alignment films 74 and 82 may be vertical alignment films. In this configuration example, a state where voltage is not applied to the fourth liquid crystal layer LC4 corresponds to the transmitting mode and a state where voltage is applied to the fourth liquid crystal layer LC4 corresponds to the absorbing mode. In the case of liquid crystalline molecules having negative dielectric anisotropy, it is preferable that a pretilt should be formed for the purpose of setting the alignment direction of the liquid crystal molecules when voltage is applied between a pixel electrode and a counter-electrode, a slit which sets the alignment direction of the liquid crystal molecules should be provided in at least one of a pixel electrode and a common electrode, or a projection should be provided on the liquid crystal layer side of a first substrate or a second substrate.

Figure 19:
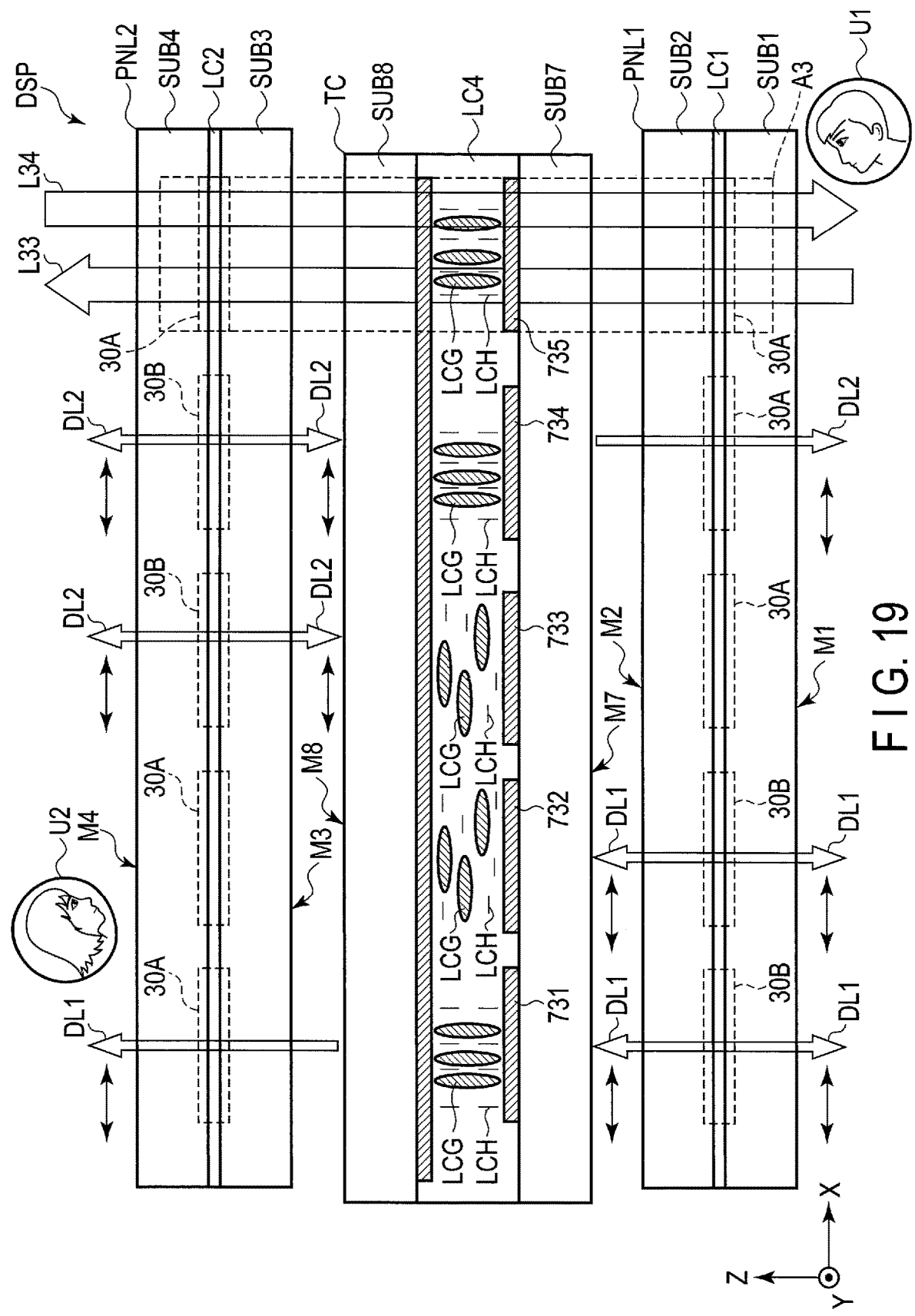
FIG. 19 is an explanatory diagram showing the display mode of the display device DSP shown in FIG. 18.

FIG. 19 is an explanatory diagram showing the display mode of the display device DSP shown in FIG. 18.

In the first display panel PNL1, the display light DL1 emitted from the first main surface M1 and the second main surface M2 is the first linearly polarized light. The display light DL1 from the first main surface M1 forms the display image of the first display panel PNL1. On the other hand, the display light DL1 from the second main surface M2 enters the transmittance control element TC.

In the transmittance control element TC, an electric field in the third direction Z is formed in areas in which third control electrodes 731, 734 and 745 are opposed to the fourth control electrode 81, respectively, and therefore the liquid crystal molecules LCH and the dyes LCG are vertically aligned such that major axes thereof extend in the third direction Z. No electric field is formed in areas in which third control electrodes 732 and 733 are opposed to the fourth control electrode 81, respectively, and therefore the liquid crystal molecules LCH and the dyes LCG are maintained in the initially aligned state and are horizontally aligned in the first direction X.

The vibration plane of the first linearly polarized light which enters the area overlapping the third control electrode 731, of the first linearly polarized light which enters from the seventh main surface M7 of the transmittance control element TC intersects or orthogonally intersects the major axes of the vertically aligned dyes LCG. Therefore, the first linearly polarized light passes through the transmittance control element TC and is hardly absorbed in the dyes LCG (transmitting mode). The display light DL1 which has passed through the eighth main surface M8 of the transmittance control element TC passes through the second display panel PNL2.

On the other hand, the vibration plane of the first linearly polarized light which enters the area overlapping the third control electrode 732, of the first linearly polarized light which enters from the seventh main surface M7 becomes substantially parallel to the major axes of the horizontally aligned dyes LCG. Therefore, the first linearly polarized light is absorbed in the dyes LCG (absorbing mode).

In the second display panel PNL2, the display light DL2 emitted from the third main surface M3 and the fourth main surface M4 is the first linearly polarized light. The display light DL2 from the fourth main surface M4 forms the display image of the second display panel PNL2. On the other hand, the display light DL2 from the third main surface M3 enters the transmittance control element TC.

The first linearly polarized light which enters the area overlapping the third control electrode 733, of the first linearly polarized light which enters from the eighth main surface M8 of the transmittance control element TC is absorbed in the dyes LCG (absorbing mode). In addition, the first linearly polarized light which enters the area overlapping the third control electrode 734, of the first linearly polarized light which enters from the eighth main surface M8 passes through the transmittance control element TC and is hardly absorbed in the dyes LCG (transmitting mode). The display light DL2 which has passed through the seventh main surface M7 of the transmittance control element TC passes through the first display panel PNL1.

Therefore, the display light DL1 from the first display panel PNL1 is seen by both the user U1 and the user U2 in the transmitting mode, whereas the display light DL1 from the first display panel PNL1 is seen by the user U1 but is not seen by the user U2 in the absorbing mode. Similarly, the display light DL2 from the second display panel PNL2 is seen by both the user U1 and the user U2 in the transmitting mode, whereas the display light DL2 from the second display panel PNL2 is seen by the user U2 but is not seen by the user U1 in the absorbing mode. According to this display device DSP, the display image of each of the first display panel PNL1 and the second display panel PNL2 can be seen by both the user U1 and the user U2 or only by one of the users in a switchable manner.

Meanwhile, attention is turned to an area A3 in which the off area 30A of the first display panel PNL1 and the off area 30A of the second display panel PNL2 overlap each other in the third direction Z. The area A3 includes an area overlapping the third control electrode 735 in the transmittance control element TC.

A natural light beam L33 which has entered the first display panel PNL1 from the first main surface M1 passes through the fourth main surface M4 and is hardly scattered or absorbed in the first display panel PNL1, the transmittance control element TC and the second display panel PNL2. A natural light beam L34 which has entered the second display panel PNL2 from the fourth main surface M4 similarly passes through the first main surface M1. That is, natural light which enters the display device DSP is hardly absorbed in an area where a display image is not displayed in each of the first display panel PNL1 and the second display panel PNL2, and as a result, the transmittance can be improved as compared to the display device DSP shown in FIG. 1 in which the polarizer PL is interposed.

Figure 20:
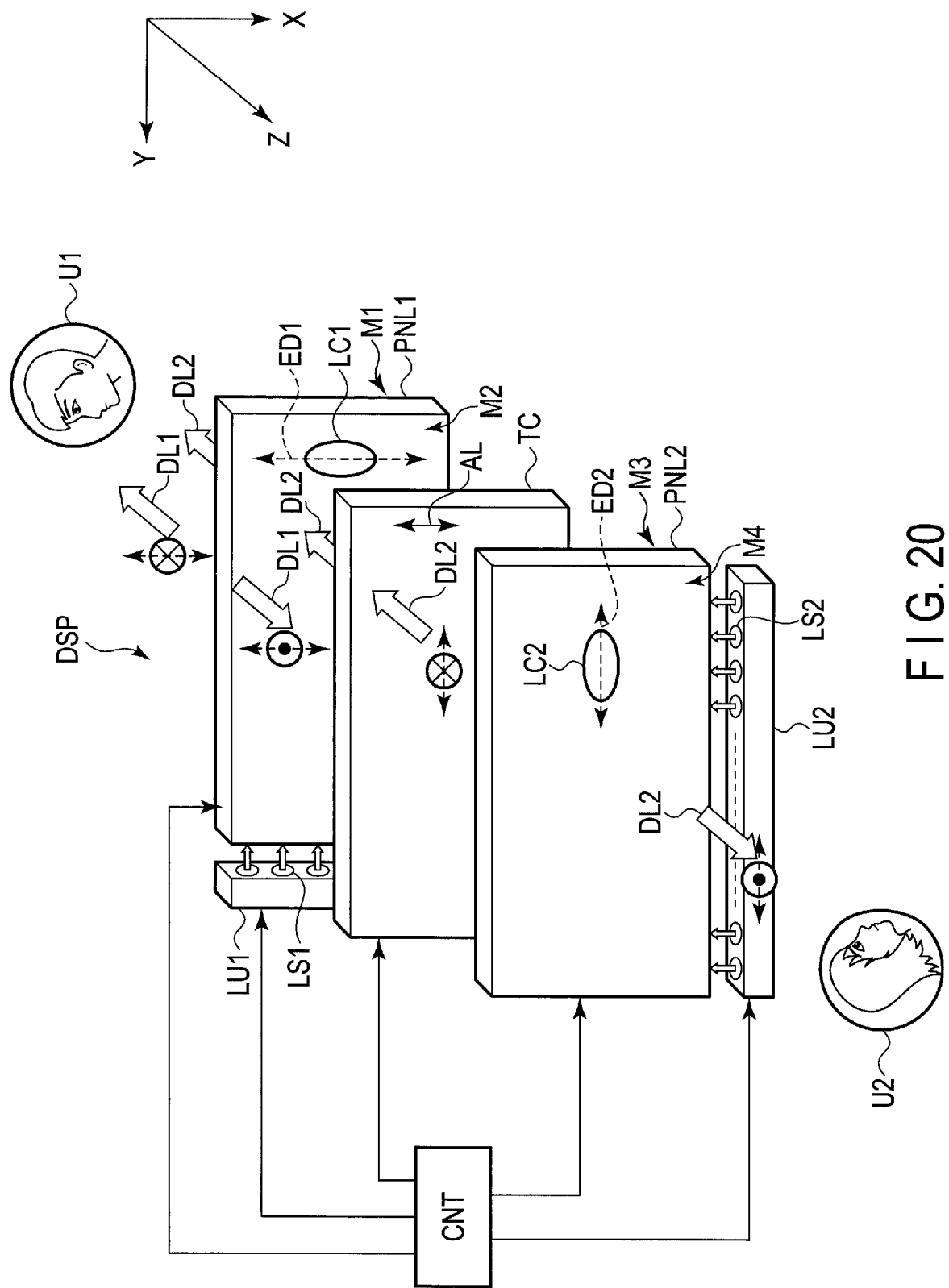
FIG. 20 is a perspective view showing another configuration example of the display device DSP of the present embodiment.

FIG. 20 is a perspective view showing another configuration example of the display device DSP of the present embodiment. The configuration example shown in FIG. 20 differs from the configuration example shown in FIG. 17 in that the extension direction ED1 intersects or orthogonally intersects the extension direction ED2. In the transmittance control element TC, an alignment treatment direction AL of the alignment films 74 and 82 (not shown) is parallel to the third direction X, is parallel to the extension direction ED1 and intersects or orthogonally intersects the extension direction ED2.

In the first display panel PNL1, the display light DL1 from the first main surface M1 forms the display image of the first display panel PNL1. The display light DL1 from the second main surface M2 enters the transmittance control element TC. If the transmittance control element TC is in the transmitting mode, the display light DL1 passes through the transmittance control element TC and the second display panel PNL2. If the transmittance control element TC is in the absorbing mode, the display light DL1 is absorbed in the transmittance control element TC.

In the second display panel PNL2, the display light DL2 from the fourth main surface M4 forms the display image of the second display panel PNL2. The display light DL2 from the third main surface M3 passes through the transmittance control element TC and the first display panel PNL1.

Therefore, the display light DL1 from the first display panel PNL1 is seen by both the user U1 and the user U2 in the transmitting mode, whereas the display light DL1 from the first display panel PNL1 is seen by the user U1 but is not seen by the user U2 in the absorbing mode. In addition, the display light DL2 from the second display panel PNL2 is seen by both the user U1 and the user U2.

As described above, a display device which can improve the visibility of the display image can be provided by the present embodiment.

The present invention is not limited to the embodiments described above but the constituent elements of the invention can be modified in various manners without departing from the spirit and scope of the invention. Various aspects of the invention can also be extracted from any appropriate combination of a plurality of constituent elements disclosed in the embodiments. Some constituent elements may be deleted in all of the constituent elements disclosed in the embodiments. The constituent elements described in different embodiments may be combined arbitrarily.

What is claimed is:

1. A display device comprising:
a first display panel comprising a first substrate, a second substrate opposed to the first substrate, and a first liquid crystal layer held between the first substrate and the second substrate;
a second display panel comprising a third substrate, a fourth substrate opposed to the third substrate, and a second liquid crystal layer held between the third substrate and the fourth substrate;
a polarizer located between the second substrate and the third substrate and including an absorption axis which allows absorption of linearly polarized light;
a retardation control element located between the first display panel and the polarizer; and
a light source unit opposed to a first end portion of the first display panel and a second end portion of the second display panel, wherein
each of the first liquid crystal layer and the second liquid crystal layer includes streak-like polymers and liquid crystal molecules,
the retardation control element comprises a fifth substrate, a sixth substrate opposed to the fifth substrate, and a third liquid crystal layer held between the fifth substrate and the sixth substrate, and
the retardation control element has a modulating mode in which the retardation control element imparts retardation to first display light and a non-modulating mode in which the retardation control element maintains a vibration plane of the first display light.

2. The display device of claim 1, wherein an extension direction of the polymers of the first liquid crystal layer and an extension direction of the polymers of the second liquid crystal layer are parallel to the absorption axis.

3. The display device of claim 2, wherein the second end portion overlaps the first end portion.

4. The display device of claim 3, wherein
the first end portion extends in the extension direction of the polymers of the first liquid crystal layer, and
the second end portion extends in the extension direction of the polymers of the second liquid crystal layer.

5. The display device of claim 1, wherein the polarizer is in contact with the sixth substrate and the third substrate.

6. The display device of claim 1, wherein the light source unit is provided on an extension portion of the first substrate and an extension portion of the third substrate.

7. The display device of claim 1, wherein the third liquid crystal layer imparts retardation of ½ wavelength to the first display light in a modulating mode.

8. A display device comprising:
a first display panel comprising a first substrate, a second substrate opposed to the first substrate, and a first liquid crystal layer held between the first substrate and the second substrate;
a second display panel comprising a third substrate, a fourth substrate opposed to the third substrate, and a second liquid crystal layer held between the third substrate and the fourth substrate;
a polarizer located between the second substrate and the third substrate and including an absorption axis which allows absorption of linearly polarized light;

a retardation control element located between the first display panel and the polarizer; and a light source unit opposed to a first end portion of the first display panel and a second end portion of the second display panel, wherein the first display panel emits illumination light from the light source unit as first display light from the first substrate and the second substrate, the second display panel emits illumination light from the light source unit as second display light from the third substrate and the fourth substrate, the first display light and the second display light are linearly polarized light, the first display light has a vibration plane parallel to the absorption axis, the second display light has a vibration plane orthogonal to the absorption axis, and the retardation control element has a modulating mode in which the retardation control element imparts retardation to the first display light and a non-modulating mode in which the retardation control element maintains the vibration plane of the first display light.

* * * * *